(12) United States Patent
Morimoto et al.

(10) Patent No.: US 10,683,456 B2
(45) Date of Patent: Jun. 16, 2020

(54) COMPOSITION, AND OPTICAL FILM INCLUDING THE COMPOSITION

(71) Applicant: Sumitomo Chemical Company, Limited, Tokyo (JP)

(72) Inventors: Masao Morimoto, Osaka (JP); Noriyuki Hida, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/494,927

(22) Filed: Apr. 24, 2017

(65) Prior Publication Data

US 2017/0306237 A1  Oct. 26, 2017

(30) Foreign Application Priority Data

Apr. 26, 2016  (JP) .................................. 2016-088397

(51) Int. Cl.
| | | |
|---|---|---|
| *G02F 1/1333* | (2006.01) | |
| *C09K 19/60* | (2006.01) | |
| *C09K 19/20* | (2006.01) | |
| *C09K 19/34* | (2006.01) | |
| *C09K 19/32* | (2006.01) | |
| *C09K 19/24* | (2006.01) | |
| *C09B 35/34* | (2006.01) | |
| *C09B 31/053* | (2006.01) | |
| *C09B 31/043* | (2006.01) | |
| *C09B 35/037* | (2006.01) | |
| *C09B 39/00* | (2006.01) | |
| *C09K 19/30* | (2006.01) | |
| *C09K 19/04* | (2006.01) | |
| *G02B 5/30* | (2006.01) | |
| *G02F 1/1335* | (2006.01) | |

(52) U.S. Cl.
CPC .......... *C09K 19/601* (2013.01); *C09B 31/043* (2013.01); *C09B 31/053* (2013.01); *C09B 35/037* (2013.01); *C09B 35/34* (2013.01); *C09B 39/00* (2013.01); *C09K 19/2007* (2013.01); *C09K 19/24* (2013.01); *C09K 19/3068* (2013.01); *C09K 19/322* (2013.01); *C09K 19/34* (2013.01); *C09K 19/3441* (2013.01); *C09K 19/3494* (2013.01); *C09K 19/3497* (2013.01); *C09K 2019/0448* (2013.01); *C09K 2019/3408* (2013.01); *G02B 5/3016* (2013.01); *G02F 1/133528* (2013.01)

(58) Field of Classification Search
CPC .. C09K 19/601; C09K 19/2007; C09K 19/24; C09K 19/3068; C09K 19/322; C09K 19/34; C09K 19/3441; C09K 19/349; C09K 19/3497; C09K 2019/0448; C09K 2019/3408; G02F 1/1333; G02F 1/133528; G02B 5/3016; C09B 31/043; C09B 31/053; C09B 35/037; C09B 35/34; C09B 39/00
USPC ..................................................... 252/299.01
See application file for complete search history.

(56) References Cited

U.S. PATENT DOCUMENTS

| | | | | |
|---|---|---|---|---|
| 8,728,976 | B2 * | 5/2014 | Morishima | ............ B41M 3/008 428/1.31 |
| 9,382,481 | B2 * | 7/2016 | Morishima | ....... G02F 1/133528 |
| 9,421,572 | B2 * | 8/2016 | Hatanaka | ............ G02B 5/3016 |

FOREIGN PATENT DOCUMENTS

JP  2013227532 A  11/2013

* cited by examiner

*Primary Examiner* — Geraldina Visconti
(74) *Attorney, Agent, or Firm* — Panitch Schwarze Belisario & Nadel LLP

(57) ABSTRACT

Provided is a composition which can be used for formation of an optical film having high quality and a high dichroic ratio even after the composition is stored for a predetermined period of time. The composition includes a compound represented by the general formula (A) and a compound represented by the general formula (B), wherein $R^{1a}$ in the general formula (A) and $R^{1b}$ in the general formula (B) are mutually different groups.

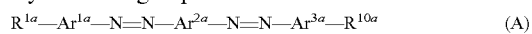

$$R^{1a}-Ar^{1a}-N=N-Ar^{2a}-N=N-Ar^{3a}-R^{10a} \quad (A)$$

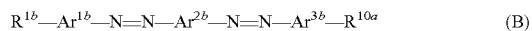

$$R^{1b}-Ar^{1b}-N=N-Ar^{2b}-N=N-Ar^{3b}-R^{10a} \quad (B)$$

13 Claims, No Drawings

COMPOSITION, AND OPTICAL FILM INCLUDING THE COMPOSITION

BACKGROUND OF THE INVENTION

Field of the Invention

The present invention relates to a composition, and an optical film including the composition.

Description of the Related Art

As a polarizing film (optical film) to be used in a liquid crystal display device etc., a polarizing film formed of a composition containing a dichroic dye is known. When the composition is stored for a long period of time, the quality of the resulting polarizing film may be deteriorated, and for solving this problem, an attempt has been made to use a plurality of dichroic dyes having mutually different specific structures (JP-A-2013-227532 (published in 7 Nov. 2013)).

However, a conventional optical film formed of a composition containing a plurality of dichroic dyes having mutually different specific structures as described in JP-A-2013-227532 (published in 7 Nov. 2013) has the problem that the dichroic ratio of the optical film is not sufficiently high.

SUMMARY OF THE INVENTION

The present inventors have extensively conducted studies, and resultantly found that when among compositions containing a plurality of dichroic dyes, a composition containing a specific combination of dichroic dyes is used, the quality of the resulting polarizing film is not deteriorated even though the composition is stored for a predetermined period of time, and the resulting polarizing film has a sufficiently high dichroic ratio, leading to the present invention.

The present invention includes the inventions described in <1> to <10> below.

<1> A composition including a compound represented by the general formula (A) and a compound represented by the general formula (B):

[Chemical Formula 1]

$$R^{1a}-Ar^{1a}-N=N-Ar^{2a}-N=N-Ar^{3a}-R^{10a} \quad (A)$$

$$R^{1b}-Ar^{1b}-N=N-Ar^{2b}-N=N-Ar^{3b}-R^{10a} \quad (B)$$

[in the general formula (A) and the general formula (B), $R^{10a}$ represents a group represented by any one of the general formulae (S-1) to (S-7):

[Chemical Formula 2]

—H  (S-1)

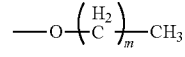  (S-2)

—CN  (S-3)

—CF$_3$  (S-4)

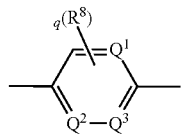  (S-5)

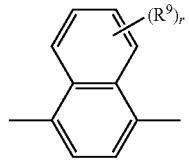  (S-6)

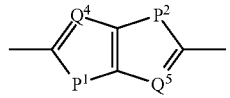  (S-7)

(in the general formula (S-2), $R^{2a}$ and $R^{3a}$ each independently represent a hydrogen atom or an alkyl group, where the alkyl groups represented by $R^{2a}$ and $R^{3a}$ may be bound to each other to form a ring; and m represents an integer of 0 to 10);

$Ar^{1a}$, $Ar^{1b}$, $Ar^{2a}$, $Ar^{2b}$, $Ar^{3a}$ and $Ar^{3b}$ each independently represent a group represented by any one of the general formulae (Ar-1) to (Ar-3):

[Chemical Formula 3]

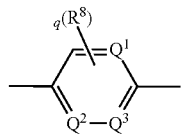  (Ar-1)

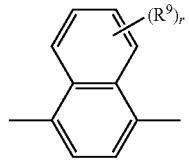  (Ar-2)

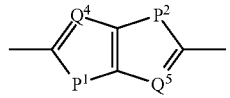  (Ar-3)

(in the general formulae (Ar-1) to (Ar-3), $P^1$ and $P^2$ each independently represent —S—, —O— or —N($R^{12}$)—, $R^{12}$ represents a hydrogen atom or an alkyl group having 1 to 4 carbon atoms, and $Q^1$, $Q^2$, $Q^3$, $Q^4$ and $Q^5$ each independently represent =N— or =CH—;

$R^8$ and $R^9$ are substituents other than a hydrogen atom, and each independently represent an alkyl group having 1 to 4 carbon atoms, an alkoxy group having 1 to 4 carbon atoms, a halogen atom or a cyano group, and one or more of hydrogen atoms in the alkyl group or the alkoxy group may be substituted with a halogen atom or a hydroxy group; and q and r each represent an integer of 0 to 2);

$R^{1a}$ represents an alkyl group having 2 to 5 carbon atoms, an alkoxy group having 2 to 5 carbon atoms, an acyl group having 2 to 5 carbon atoms, an alkoxycarbonyl group having 2 to 5 carbon atoms, an oxycarbonyl group having 2 to 5 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group; and $R^{1b}$ represents an alkyl group having 3 to 20 carbon atoms, an alkoxy group having 3 to 20 carbon atoms, an acyl group having 3 to 20 carbon atoms, an alkoxycarbonyl group having 3 to 20 carbon atoms, an oxycarbonyl group having 3 to 20 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group, with the proviso that $R^{1a}$ and $R^{1b}$ are mutually different groups].

<2> The composition according to <1>, wherein in the general formula (A) and the general formula (B), $R^{10a}$ is a group represented by the general formula (S-2).

<3> The composition according to <1> or <2>, wherein $Ar^{1a}$ and $Ar^{1b}$ are the same group, $Ar^{2a}$ and $Ar^{2b}$ are the same group, and $Ar^{3a}$ and $Ar^{3b}$ are the same group.

<4> The composition according to any one of <1> to <3>, further including a polymerizable liquid crystal compound.

<5> The optical film according to <4>, wherein the polymerizable liquid crystal compound is a compound which shows a smectic liquid crystal phase.

<6> An optical film including the composition according to any one of <1> to <5>.

<7> An optical film which is formed by polymerizing a polymerizable component contained in the composition according to <4> or <5>.

<8> A circular polarizing plate including the optical film according to <6> or <7>.

<9> A liquid crystal display device including the optical film according to <6> or <7>.

<10> A display device including the circular polarizing plate according to <8>.

With the composition of the present invention, an optical film of high quality can be formed even after the composition is stored for a predetermined period of time, and the optical film has a sufficiently high dichroic ratio.

DETAILED DESCRIPTION OF THE PREFERRED EMBODIMENTS

Hereinafter, embodiments of the present invention will be described in detail. In the present application, "A to B" means "not less than A and not more than B".

Embodiment 1: Composition

A composition according to embodiment 1 of the present invention includes a compound represented by the general formula (A) (hereinafter, referred to as a compound (A)) and a compound (B) represented by the general formula (B) (hereinafter, referred to as a compound (B)):

[Chemical Formula 4]

$R^{1a}$—$Ar^{1a}$—N═N—$Ar^{2a}$—N═N—$Ar^{3a}$—$R^{10a}$     (A)

$R^{1b}$—$Ar^{1b}$—N═N—$Ar^{2b}$—N═N—$Ar^{3b}$—$R^{10a}$     (B)

[in the general formula (A) and the general formula (B), $R^{10a}$ represents a group represented by any one of the general formulae (S-1) to (S-7):

[Chemical Formula 5]

—H     (S-1)

(S-2)

—CN     (S-3)

—CF$_3$     (S-4)

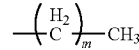
(S-5)

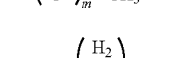
(S-6)

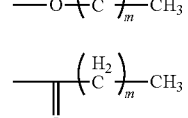
(S-7)

(in the general formula (S-2), $R^{2a}$ and $R^{3a}$ each independently represent a hydrogen atom or an alkyl group, where the alkyl groups represented by $R^{2a}$ and $R^{3a}$ may be bound to each other to form a ring; and m represents an integer of 0 to 10);

[Chemical Formula 6]

(Ar-1)

(Ar-2)

(Ar-3)

(in the general formulae (Ar-1) to (Ar-3), $P^1$ and $P^2$ each independently represent —S—, —O— or —N($R^{12}$)—, $R^{12}$ represents a hydrogen atom or an alkyl group having 1 to 4 carbon atoms, and $Q^1$, $Q^2$, $Q^3$, $Q^4$ and $Q^5$ each independently represent ═N— or ═CH—;

$R^8$ and $R^9$ are substituents other than a hydrogen atom, and each independently represent an alkyl group having 1 to 4 carbon atoms, an alkoxy group having 1 to 4 carbon atoms, a halogen atom or a cyano group, and one or more of hydrogen atoms in the alkyl group or the alkoxy group may be substituted with a halogen atom or a hydroxy group; and q and r each represent an integer of 0 to 2);

$R^{1a}$ represents an alkyl group having 2 to 5 carbon atoms, an alkoxy group having 2 to 5 carbon atoms, an acyl group having 2 to 5 carbon atoms, an alkoxycarbonyl group having 2 to 5 carbon atoms, an oxycarbonyl group having 2 to 5 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group; and $R^{1b}$ represents an alkyl group having 3 to 20 carbon atoms, an alkoxy group having 3 to 20 carbon atoms, an acyl group having 3 to 20 carbon atoms, an alkoxycarbonyl group having 3 to 20 carbon atoms, an oxycarbonyl group having 3 to 20 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group, with the proviso that $R^{1a}$ and $R^{1b}$ are mutually different groups].

The composition of the present invention contains the compound (A) and the compound (B) which have mutually different structures. Consequently, the composition of the present invention has improved stability, and can be used as a raw material for an optical film having a high dichroic ratio.

The reason why the stability of the composition of the present invention is improved may be that in the composition of the present invention, the compound (A) and the compound (B) are hardly crystallized, and compatibility (solubility) of the compound (A) and the compound (B) is thus improved, resulting in improvement of the stability of the composition of the present invention.

Preferably, the composition of the present invention further contains a polymerizable liquid crystal compound. From the composition further containing the polymerizable liquid crystal compound, an optical film (polarizing film) containing the compound (A) and the compound (B) each serving as a dichroic dye can be suitably formed by polymerizing the polymerizable liquid crystal compound (polymerizable component) in the composition.

Components that may be contained in the composition of the present invention will be described below.

<Dichroic Dye>

The compound (A) and the compound (B) in the present invention each serve as a dichroic dye, and usually has an absorption at a wavelength in the range of 400 to 800 nm.

The positional isomers at the azobenzene part of each of the compound (A) and the compound (B) are preferably trans-isomers.

$R^{10a}$ in the compound (A) and $R^{10a}$ in the compound (B) are the same group. $R^{10a}$ in each of the compound (A) and the compound (B) is preferably a group represented by the general formula (S-2).

The groups represented by $R^{2a}$ and $R^{3a}$ in the group represented by the general formula (S-2) are each preferably alkyl group, and the alkyl group is preferably an alkyl group having 1 to 3 carbon atoms, or a group represented by the following general formula (S-8) or (S-9).

[Chemical Formula 7]

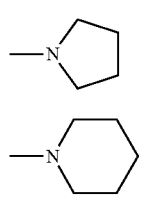

(R-8)

(R-9)

$Ar^{1a}$, $Ar^{1b}$, $Ar^{2a}$, $Ar^{2b}$, $Ar^{3a}$ and $Ar^{3b}$ in the compound (A) and the compound (B) each independently represent a group represented by any one of the general formulae (Ar-1) to (Ar-3):

[Chemical Formula 8]

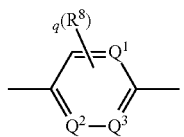

(Ar-1)

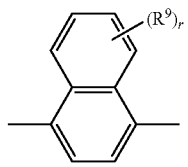

(Ar-2)

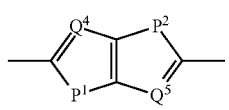

(Ar-3)

In the general formulae (Ar-1) to (Ar-3), $P^1$ and $P^2$ each independently represent —S—, —O— or —N($R^{12}$)—, $R^{12}$ represents a hydrogen atom or an alkyl group having 1 to 4 carbon atoms, and $Q^1$, $Q^2$, $Q^3$, $Q^4$ and $Q^5$ each independently represent =N— or =CH—. $R^8$ and $R^9$ are substituents other than a hydrogen atom, and each independently represent an alkyl group having 1 to 4 carbon atoms, an alkoxy group having 1 to 4 carbon atoms, a halogen atom or a cyano group, and one or more of hydrogen atoms in the alkyl group or the alkoxy group may be substituted with a halogen atom or a hydroxy group. q and r each represent an integer of 0 to 2.

The groups represented by the general formulae (Ar-1) to (Ar-3) are not particularly limited, and are, for example, groups represented by the following formulae (R-1) to (R-10).

[Chemical Formula 9]

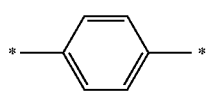

(R-1)

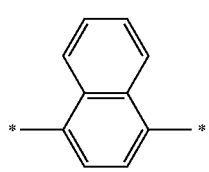

(R-2)

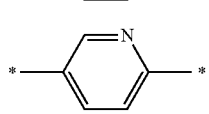

(R-3)

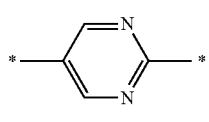

(R-4)

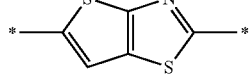

(R-5)

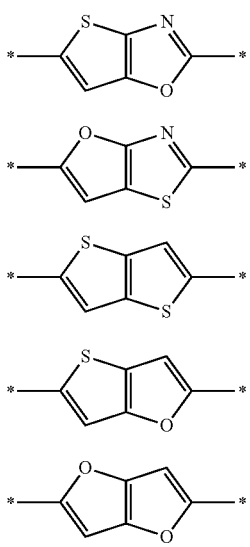

(R-6)
(R-7)
(R-8)
(R-9)
(R-10)

In the above-mentioned groups, $Ar^{1a}$, $Ar^{1b}$, $Ar^{3a}$ and $Ar^{3b}$ are each preferably a group represented by the formula (R-1), and $Ar^{2a}$ and $Ar^{2b}$ are each preferably a group represented by the formula (R-5).

$Ar^{1a}$ in the compound (A) and $Ar^{1b}$ in the compound (B) contained in the composition of the present invention are preferably the same group. $Ar^{2a}$ in the compound (A) and $Ar^{2b}$ in the compound (B) are preferably the same group, and $Ar^{3a}$ in the compound (A) and $Ar^{3b}$ in the compound (B) are preferably the same group. Particularly, $Ar^{1a}$, $Ar^{2a}$ and $Ar^{3a}$ in the compound (A) are preferably the same groups as $Ar^{1b}$, $Ar^{2b}$ and $Ar^{3b}$ in the compound (B), respectively.

In other words, it is preferred that in the composition of the present invention, the compound (A) and the compound (B) have the same structure except that $R^{1a}$ and $R^{1b}$ are mutually different groups. When the compound (A) and the compound (B) have the same structure except that $R^{1a}$ and $R^{1b}$ are mutually different groups, the dichroic ratio of the resulting optical film tends to be improved, and there is a favorable effect on productivity of the composition as described later.

$R^{1a}$ in the compound (A) represents an alkyl group having 2 to 5 carbon atoms, an alkoxy group having 2 to 5 carbon atoms, an acyl group having 2 to 5 carbon atoms, an alkoxycarbonyl group having 2 to 5 carbon atoms, an oxycarbonyl group having 2 to 5 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group.

$R^{1a}$ is preferably an alkyl group having 2 to 5 carbon atoms, an alkoxy group having 2 to 5 carbon atoms, an acyl group having 2 to 5 carbon atoms, an alkoxycarbonyl group having 2 to 5 carbon atoms or an oxycarbonyl group having 2 to 5 carbon atoms.

$R^{1b}$ in the compound (B) is a group different from $R^{1a}$. $R^{1b}$ represents an alkyl group having 3 to 20 carbon atoms, an alkoxy group having 3 to 20 carbon atoms, an acyl group having 3 to 20 carbon atoms, an alkoxycarbonyl group having 3 to 20 carbon atoms, an oxycarbonyl group having 3 to 20 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group.

$R^{1b}$ is preferably an alkyl group having 2 to 5 carbon atoms, an alkoxy group having 2 to 5 carbon atoms, an acyl group having 2 to 5 carbon atoms, an alkoxycarbonyl group having 2 to 5 carbon atoms or an oxycarbonyl group having 2 to 5 carbon atoms.

When $R^{1a}$ and $R^{1b}$ are each independently an alkyl group having 2 to 5 carbon atoms, an alkoxy group having 2 to 5 carbon atoms, an acyl group having 2 to 5 carbon atoms, an alkoxycarbonyl group having 2 to 5 carbon atoms or an oxycarbonyl group having 2 to 5 carbon atoms, it is preferred that the number of carbon atoms in $R^{1a}$ is smaller than the number of carbon atoms in $R^{1b}$.

Preferably, $R^{1a}$ and $R^{1b}$ are both the same kind of groups. Here, the phrase "$R^{1a}$ and $R^{1b}$ are both the same kind of groups" means that $R^{1a}$ and $R^{1b}$ both belong to the same category of groups and are selected from the group consisting of the above-mentioned alkyl group, alkoxy group, acyl group, alkoxycarbonyl group, oxycarbonyl group and halogen atom.

The compound (A) in the present invention is not particularly limited as long as it satisfies the foregoing conditions, and the compound (A) is, for example, a compound represented by each of the following formulae (A-1) to (A-19) (hereinafter, referred to as a compound (A-N) (N: integer of 1 to 19)).

[Chemical Formula 10]

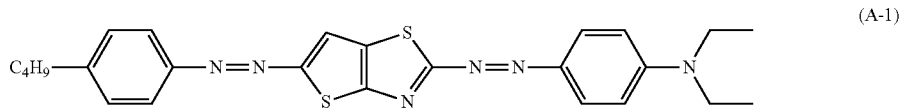

(A-1)

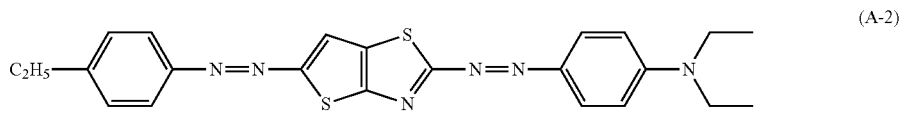

(A-2)

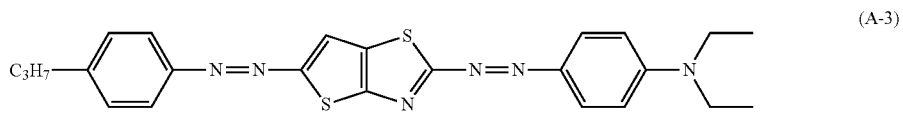

(A-3)

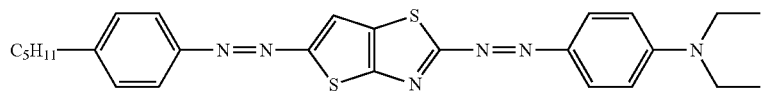
(A-4)
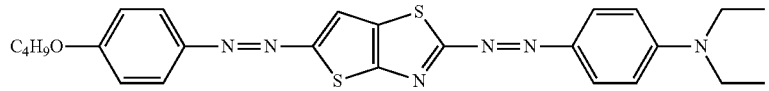
(A-5)
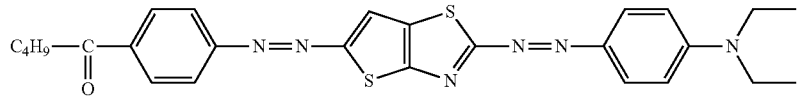
(A-6)
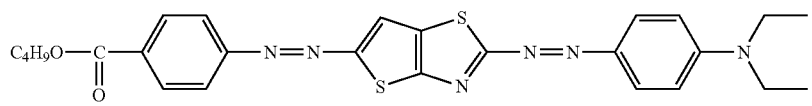
(A-7)
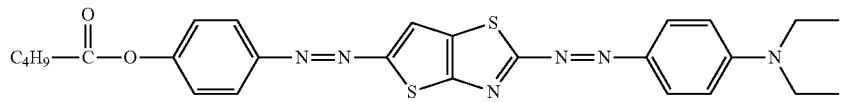
(A-8)
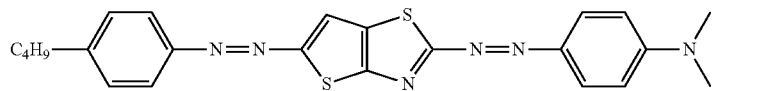
(A-9)
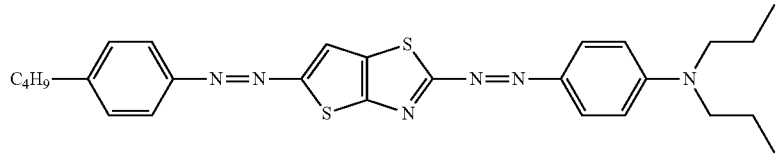
(A-10)
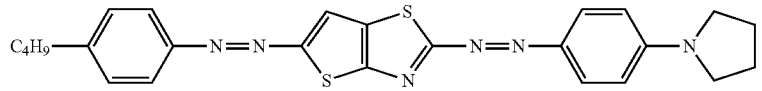
(A-11)
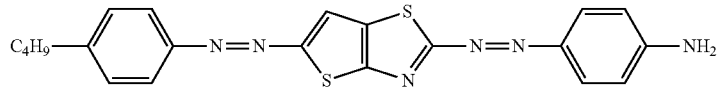
(A-12)
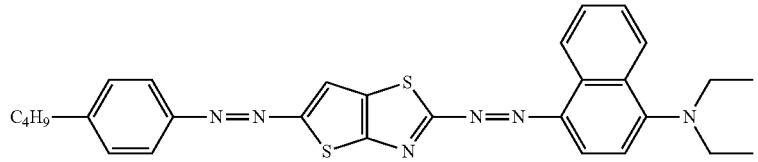
(A-13)
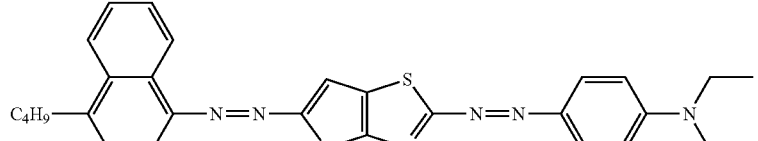
(A-14)
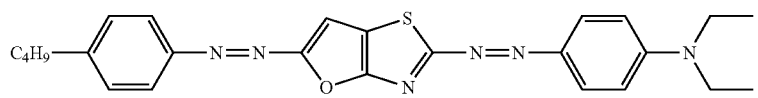
(A-15)
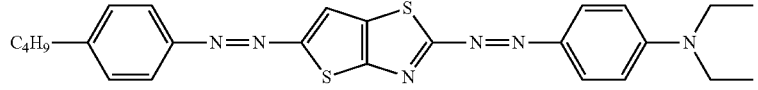
(A-16)

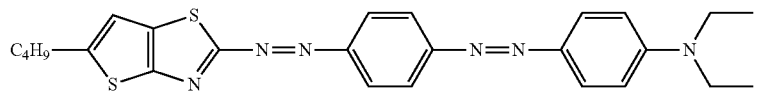
(A-17)

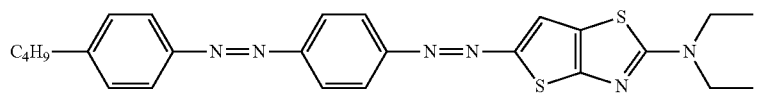
(A-18)

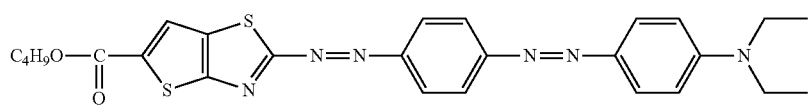
(A-19)

The compound (A) in the present invention is preferably the compound (A-1), the compound (A-4), the compound (A-7), the compound (A-9), the compound (A-10), the compound (A-17) or the compound (A-19), more preferably the compound (A-1), the compound (A-17) or the compound (A-19) among the above-mentioned compounds.

The compound (A) in the present invention may be a single compound, or a mixture of a plurality of compounds having the same group as $R^{1a}$.

The compound (B) in the present invention is not particularly limited as long as it satisfies the foregoing conditions, and the compound (B) is, for example, a compound represented by each of the following formulae (B-1) to (B-19) (hereinafter, referred to as a compound (B-M) (M: integer of 1 to 19)).

[Chemical Formula 11]

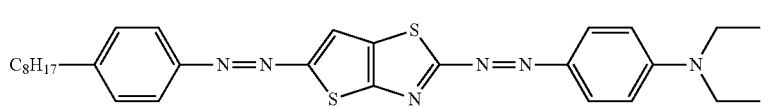
(B-1)

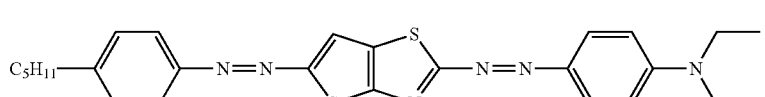
(B-2)

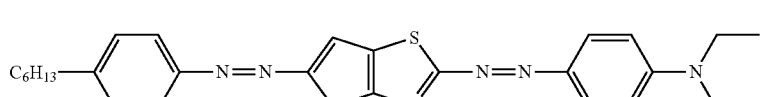
(B-3)

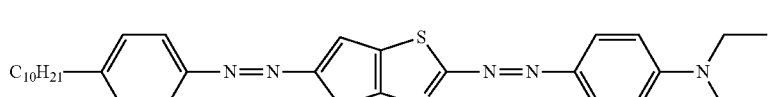
(B-4)

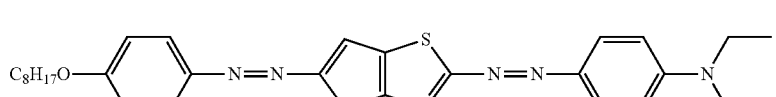
(B-5)

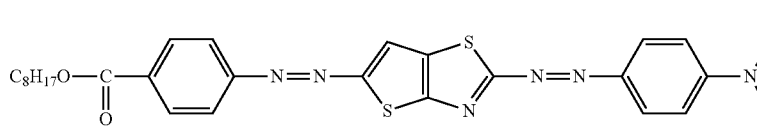
(B-6)

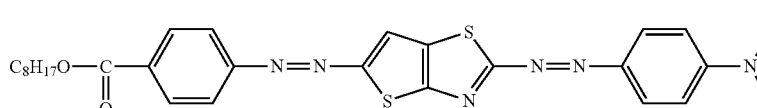
(B-7)

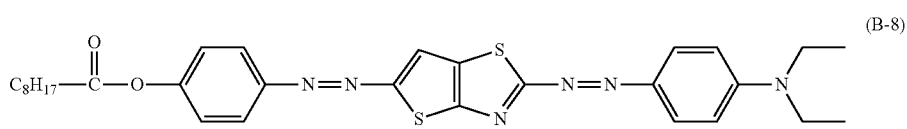
(B-8)

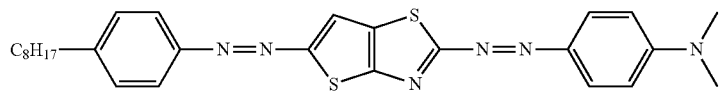
(B-9)

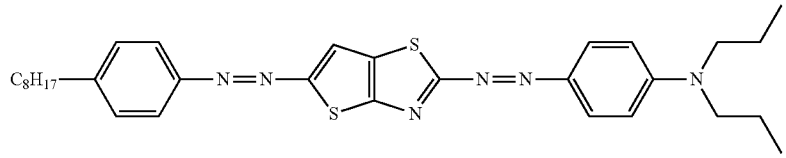
(B-10)

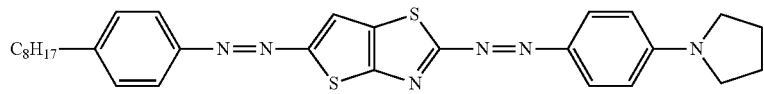
(B-11)

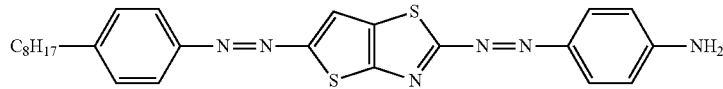
(B-12)

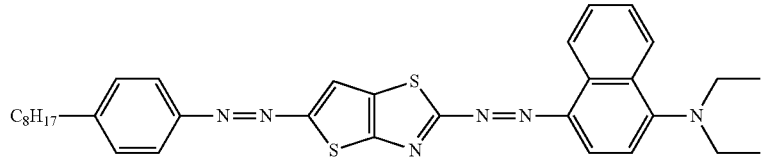
(B-13)

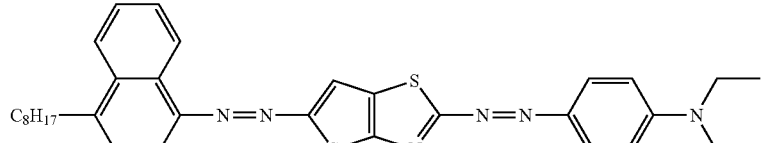
(B-14)

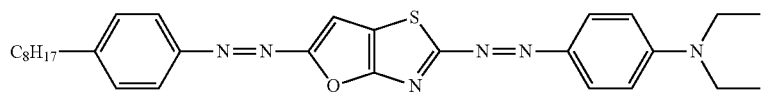
(B-15)

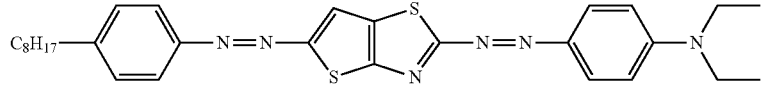
(B-16)

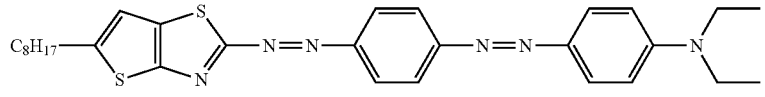
(B-17)

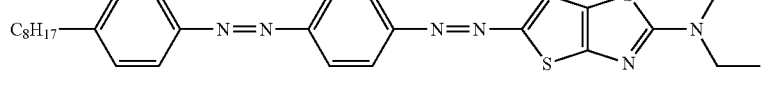
(B-18)

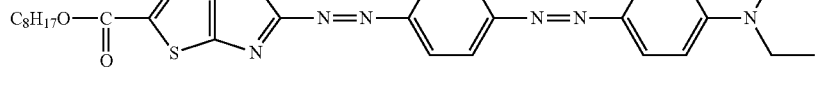
(B-19)

The compound (B) in the present invention is preferably the compound (B-1), the compound (B-4), the compound (B-7), the compound (B-9), the compound (B-10), the compound (B-17) or the compound (B-19), more preferably the compound (B-1), the compound (B-17) or the compound (B-19) among the above-mentioned compounds.

The compound (B) in the present invention may be a single compound, or a mixture of a plurality of compounds having the same group as $R^{1b}$.

The combination of compound (A) and compound (B) is preferably a combination of compound (A-1) and compound (B-1), a combination of compound (A-4) and compound (B-4), a combination of compound (A-7) and compound (B-7), a combination of compound (A-9) and compound (B-9), a combination of compound (A-10) and compound (B-10), a combination of compound (A-17) and compound (B-17) or a combination of compound (A-19) and compound (B-19), more preferably a combination of compound (A-1)

and compound (B-1), a combination of compound (A-17) and compound (B-17) or a combination of compound (A-19) and compound (B-19). Even when the compound (A) and/or the compound (B) are (is) a mixture of a plurality of compounds, the compound (A) and the compound (B) contained in the composition may contain the preferred combination of compounds.

It is advantageous in productivity of the composition that the compound (A) and the compound (B) have the same structure except that $R^{1a}$ and $R^{1b}$ are mutually different groups because the compound (A) and the compound (B) can be produced from the same raw material. For explanation with a specific example, the compound (A) and the compound (B) can be produced in accordance with, for example, the method disclosed in JP-A-1-146960.

Examples of the specific method for producing the compound (A) and the compound (B) include the method shown below.

A compound represented by the following general formula (C-1) (hereinafter, referred to as a compound (C-1) and a compound represented by the following general formula (C-2) (hereinafter, referred to as a compound (C-2)):

[Chemical Formula 12]

$$R^{1a}\text{—Ar}^1\text{—NH}_2 \qquad (\text{C-1})$$

$$R^{1b}\text{—Ar}^1\text{—NH}_2 \qquad (\text{C-2})$$

[each symbol in the general formula (C-1) and the general formula (C-2) represents the same group as that of each symbol in the general formula (A) and the general formula (B)] are each diazotized by an appropriate method, and a compound represented by the following general formula (D-1) (hereinafter, referred to as a compound (D-1)) and a compound represented by the following general formula (D-2) (hereinafter, referred to as a compound (D-2)) are separately prepared in accordance with the method described in JP-A-1-146960.

[Chemical Formula 13]

$$R^{1a}\text{—Ar}^1\text{—N}{=}\text{N—Ar}^2\text{—NH}_2 \qquad (\text{D-1})$$

$$R^{1b}\text{—Ar}^1\text{—N}{=}\text{N—Ar}^2\text{—NH}_2 \qquad (\text{D-2})$$

[each symbol in the general formula (D-1) and the general formula (D-2) represents the same group as that of each symbol in the general formula (A) and the general formula (B)].

Subsequently, the compound (D-1) and the compound (D-2) are subjected to a diazo coupling reaction with a compound represented by the following general formula (E-1) (hereinafter, referred to as a compound (E-1)) to produce the compound (A) and the compound (B).

[Chemical Formula 14]

[each symbol in the general formula (E-1) represents the same group as that of each symbol in the general formula (A) and the general formula (B)].

The composition of the present invention can be prepared by separately producing the compound (A) and the compound (B) in a manner as described above, and then mixing these compounds.

Meanwhile, for example, when a mixture of compound (C-1) and compound (C-2) is subjected to a diazo coupling reaction at a time in one reaction vessel, a mixture of compound (D-1) and compound (D-2) can be obtained, and by further subjecting the mixture to a diazo coupling reaction with the compound (E-1), the compound (A) and the compound (B) can be simultaneously and conveniently synthesized.

The compound (A) and the compound (B) can be simultaneously produced in one reaction as described above. The compound (A) and the compound (B) can also be produced by a conventional known method. A person skilled in the art can produce the compound (A) and the compound (B) easily and with a high purity by using, for example a method conforming to the method disclosed in JP-A-1-146960.

In the composition of the present invention, the content of the compound (A) is preferably 2% by mass to 98% by mass, more preferably 33% by mass to 66% by mass provided that the total of the content of the compound (A) and the content of the compound (B) is 100% by mass. When the compound (A) and/or the compound (B) are (is) a mixture of a plurality of compounds, the above-mentioned content means the total amount of the plurality of compounds.

<Polymerizable Liquid Crystal Compound>

The polymerizable liquid crystal compound is a compound which has a polymerizable group in the molecule, and can be oriented to show a liquid crystal phase. The polymerizable liquid crystal compound is preferably a compound which can be singly oriented to show a liquid crystal phase.

The polymerizable group means a group which is involved in a polymerization reaction, and the polymerizable group is preferably a photopolymerizable group. Here, the polymerizable group is a group which can be involved in a polymerization reaction by active radicals, acids and the like generated from a polymerization initiator as described later. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group and an oxetanyl group. Among them, an acryloyloxy group, a methacryloyloxy group, a vinyloxy group, an oxiranyl group and an oxetanyl group are preferred, and an acryloyloxy group is more preferred.

The polymerizable liquid crystal compound may be a thermotropic liquid crystal-type compound, or a lyotropic liquid crystal-type compound.

The polymerizable liquid crystal compound in the present invention is preferably a smectic liquid crystal compound showing a smectic liquid crystal phase, more preferably a high-order smectic liquid crystalline compound showing a high-order smectic liquid crystal phase. The composition of the present invention which contains a polymerizable liquid crystal compound showing a smectic liquid crystal phase is capable of giving a polarizing film (optical film) that is superior in polarizing performance. The composition of the present invention may contain two or more polymerizable liquid crystal compounds.

The compound (A) and the compound (B) can exhibit high dichroism even in a state of being dispersed among dense molecular chains formed from the polymerizable liquid crystal compound showing a smectic liquid crystal phase.

Thus, the composition of the present invention contains a polymerizable liquid crystal compound, and thus can be suitably used for formation of a polarizing film (optical film) having a high dichroic ratio. An optical film formed by polymerizing the polymerizable liquid crystal compound as a polymerizable component is suitable because it is a polarizing film (optical film) that is superior in stability.

Examples of the high-order smectic liquid crystal phase include a smectic B phase, a smectic D phase, a smectic E phase, a smectic F phase, a smectic G phase, a smectic H phase, a smectic I phase, a smectic J phase, a smectic K phase and a smectic L phase. Among them, a smectic B phase, a smectic F phase and a smectic I phase are preferred, and a smectic B phase is more preferred. When the smectic liquid crystal phase shown by the polymerizable liquid crystal compound is such a high-order smectic phase, a polarizing film (optical film) having a higher orientation order degree is obtained. A polarizing film (optical film) obtained from a composition containing a polymerizable liquid crystal compound showing a high-order smectic liquid crystal phase having a high orientation order degree shows a Bragg peak derived from a high-order structure such as a hexatic phase or a crystal phase in X-ray diffraction measurement. The Bragg peak is a peak derived from a surface periodic structure of molecular orientation. The periodic interval (order period) of a polarizing film (optical film) obtained from the composition of the present invention is preferably 0.30 to 0.50 nm.

The kind of the liquid crystal phase shown by the polymerizable liquid crystal compound can be confirmed by the method described below. An appropriate base material is provided, a solution containing a polymerizable liquid crystal compound and a solvent is applied to the base material to form a coating film on the base material, and a heating treatment or decompression treatment is then performed to remove a solvent contained in the coating film. Subsequently, the coating film formed on the base material is heated to an isotropic phase temperature, and then gradually cooled to develop a liquid crystal phase, and the liquid crystal phase is examined by texture observation with a polarizing microscope, X-ray diffraction measurement or differential scanning calorimetry. In the examination, for example, it can be confirmed that the polymerizable liquid crystal compound shows a nematic liquid crystal phase when cooled to a first temperature, and shows a smectic liquid crystal phase when further cooled to a second temperature gradually.

The polymerizable liquid crystal composition is preferably a compound represented by the formula (4) (hereinafter, also referred to as a "compound (4)").

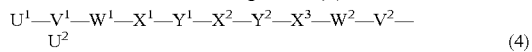
(4)

(in the formula, $X^1$, $X^2$ and $X^3$ each independently represent a 1,4-phenylene group optionally having a substituent, or a cyclohexane-1,4-diyl group optionally having a substituent, with the proviso that at least one of $X^1$, $X^2$ and $X^3$ is a 1,4-phenylene group optionally having a substituent, and —$CH_2$— in the cyclohexane-1,4-diyl group may be substituted with —O—, —S— or —NR—, where R represents an alkyl group having 1 to 6 carbon atoms, or a phenyl group;

$Y^1$ and $Y^2$ each independently represent a single bond, —$CH_2CH_2$—, —$CH_2O$—, —COO—, —OCOO—, —N=N—, —$CR^a$=$CR^b$—, —C≡C— or —$CR^a$=N—, where $R^a$ and $R^b$ each independently represent a hydrogen atom or an alkyl group having 1 to 4 carbon atoms;

$U^1$ represents a hydrogen atom or a polymerizable group;
$U^2$ represents a polymerizable group;
$W^1$ and $W^2$ each independently represent a single bond, —O—, —S—, —COO— or —OCOO—; and
$V^1$ and $V^2$ each independently represent an alkanediyl group having 1 to 20 carbon atoms and optionally having a substituent, and —$CH_2$— in the alkanediyl group may be substituted with —O—, —S— or —NH—).

In the compound (4), at least one of $X^1$, $X^2$ and $X^3$ is a 1,4-phenylene group optionally having a substituent.

The 1,4-phenylene group optionally having a substituent is preferably a 1,4-phenylene group having no substituent. The cyclohexane-1,4-diyl group optionally having a substituent is preferably a trans-cyclohexane-1,4-diyl group optionally having a substituent. The trans-cyclohexane-1,4-diyl group optionally having a substituent is preferably a trans-cyclohexane-1,4-diyl group having no substituent.

Examples of the optional substituent in the 1,4-phenylene group optionally having a substituent or the cyclohexane-1,4-diyl group optionally having a substituent include alkyl groups having 1 to 4 carbon atoms, such as a methyl group, an ethyl group and a n-butyl group; a cyano group; and a halogen atom.

$Y^1$ is preferably a single bond, —$CH_2CH_2$— or —COO—, and $Y^2$ is preferably —$CH_2CH_2$— or —$CH_2O$—.

$U^1$ is a hydrogen atom or a polymerizable group, preferably a polymerizable group. $U^2$ is a polymerizable group. $U^1$ and $U^2$ are each preferably a polymerizable group, more preferably a photopolymerizable group. The polymerizable liquid crystal compound having a photopolymerizable group is advantageous because it can be polymerized under a lower temperature condition.

The polymerizable groups represented by $U^1$ and $U^2$ may be mutually different, but they are preferably the same. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group and an oxetanyl group. Among them, a vinyloxy group, an acryloyloxy group, a methacryloyloxy group, an oxiranyl group and an oxetanyl group are preferred, and an acryloyloxy group is more preferred.

Examples of the alkanediyl group represented by $V^1$ or $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group and an icosane-1,20-diyl group. $V^1$ and $V^2$ are each preferably an alkanediyl group having 2 to 12 carbon atoms, more preferably an alkanediyl group having 6 to 12 carbon atoms.

Examples of the optional substituent in the alkanediyl group having 1 to 20 carbon atoms and optionally having a substituent include a cyano group and a halogen atom. The alkanediyl group is preferably an alkanediyl group having no substituent, more preferably a linear alkanediyl group having no substituent.

Preferably, $W^1$ and $W^2$ are each independently a single bond or —O—.

Specific examples of the compound (4) include compounds represented by the following formulae (4-1) to (4-43). When the compound (4) has a cyclohexane-1,4-diyl group, the cyclohexane-1,4-diyl group is preferably a trans-type group.

[Chemical Formula 15]
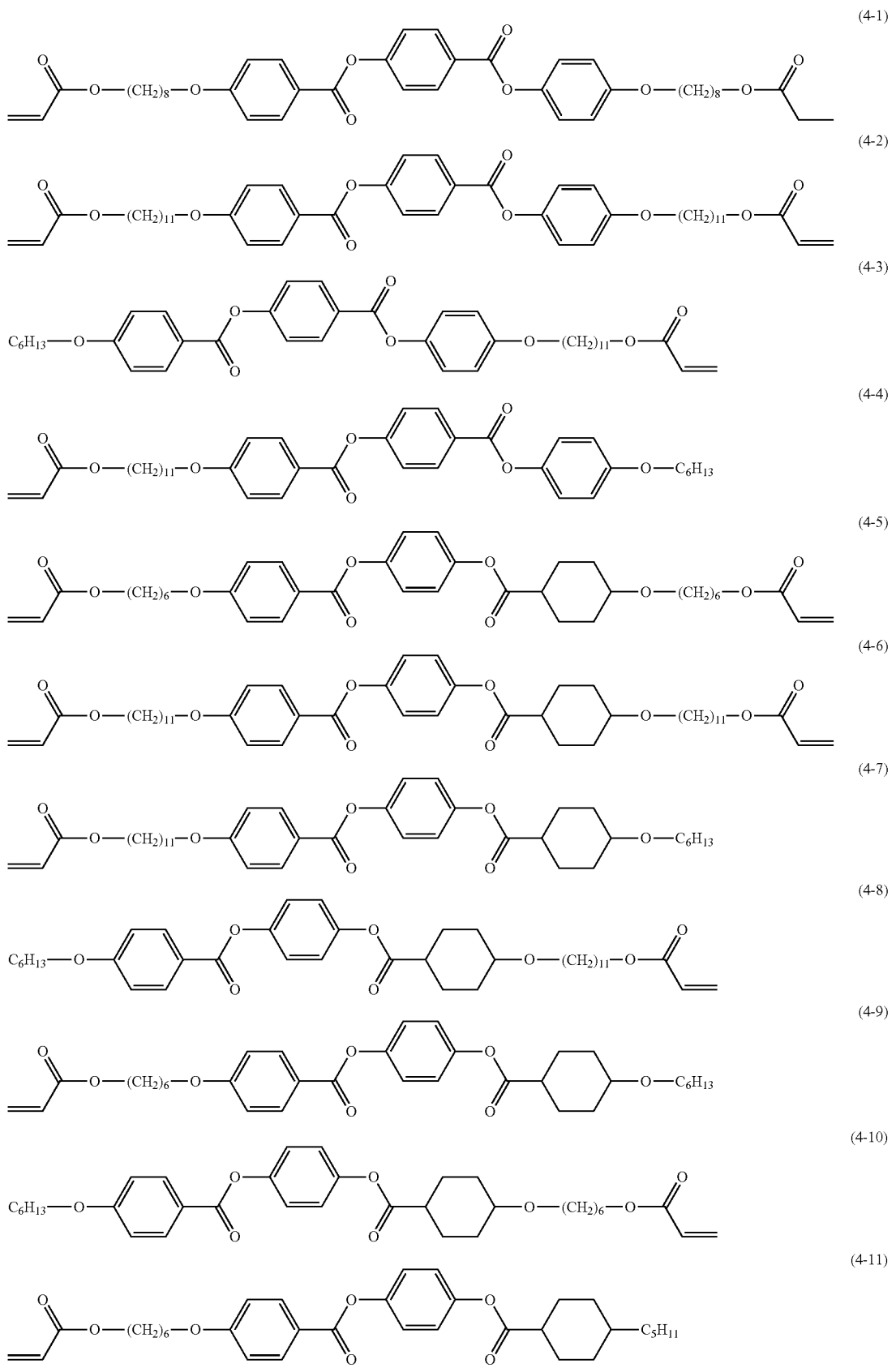

-continued
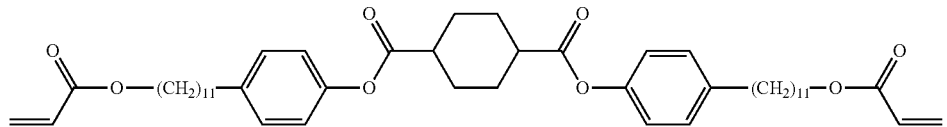
(4-12)
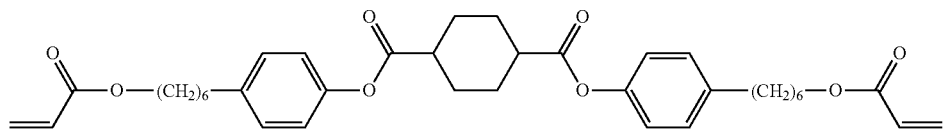
(4-13)
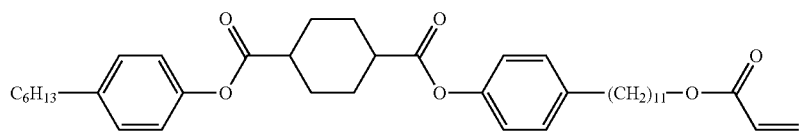
(4-14)
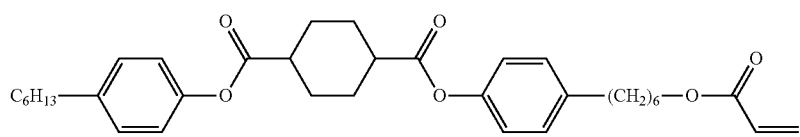
(4-15)
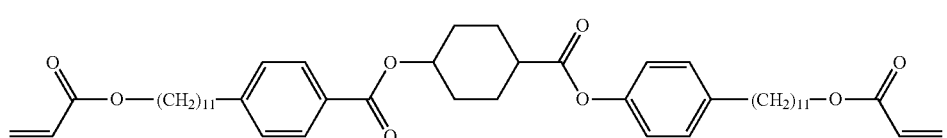
(4-16)
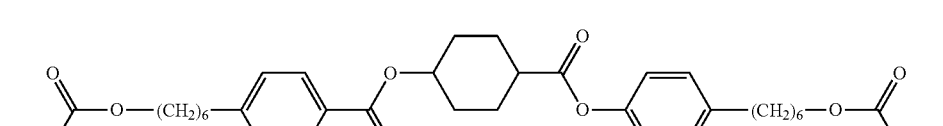
(4-17)
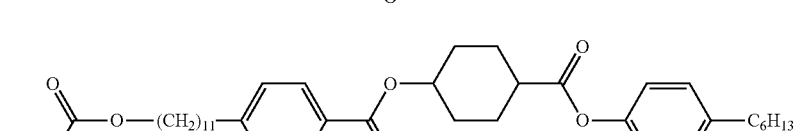
(4-18)
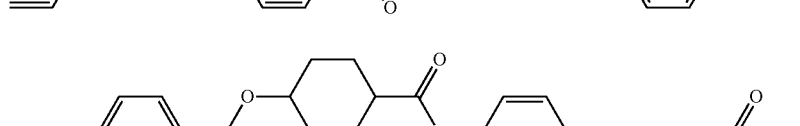
(4-19)
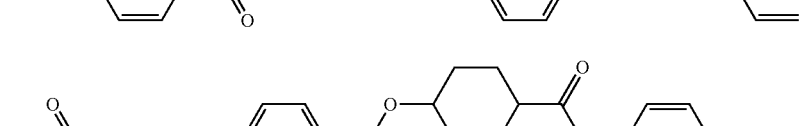
(4-20)
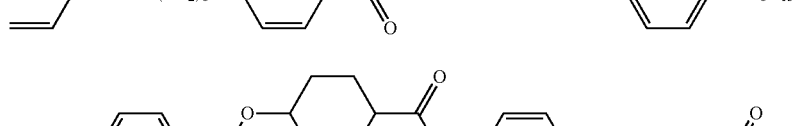
(4-21)
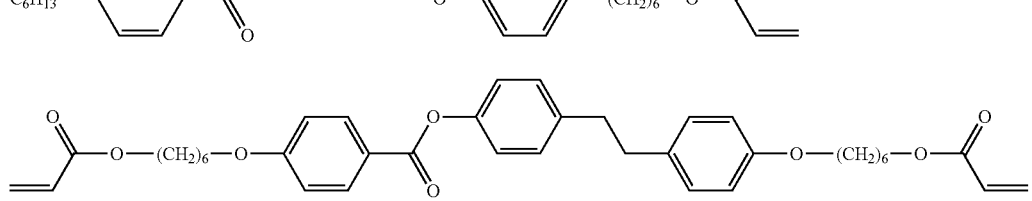
(4-22)

(4-23)
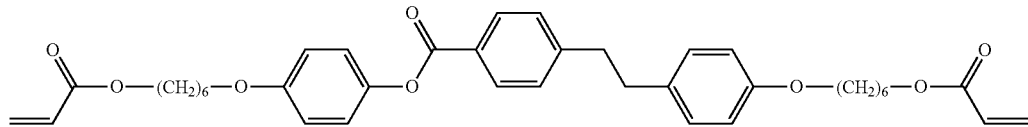
(4-24)
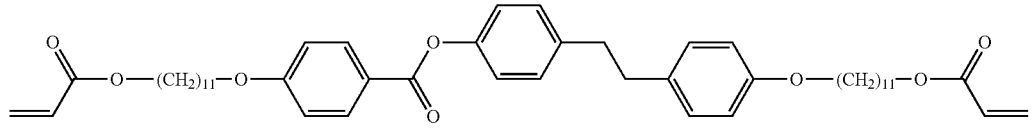
(4-25)
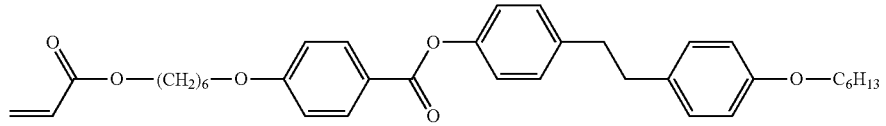
(4-26)
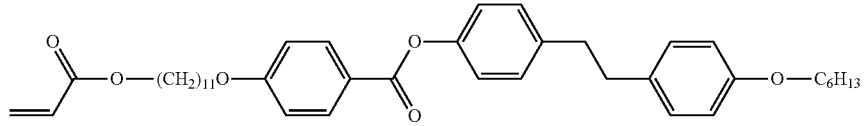
(4-27)
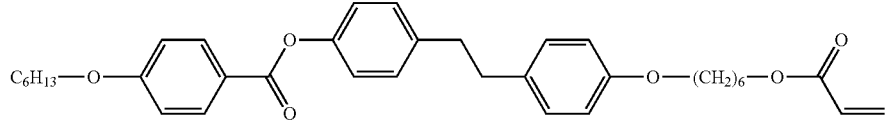
(4-28)
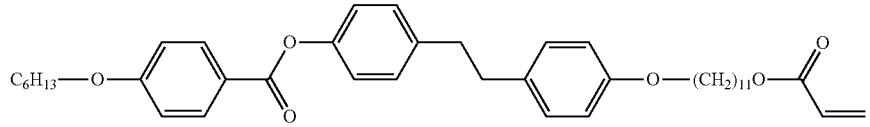
(4-29)
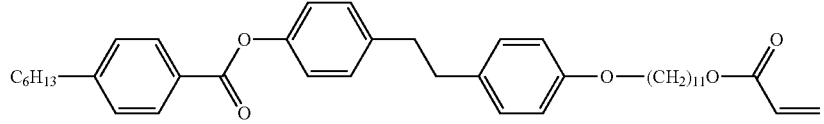
(4-30)
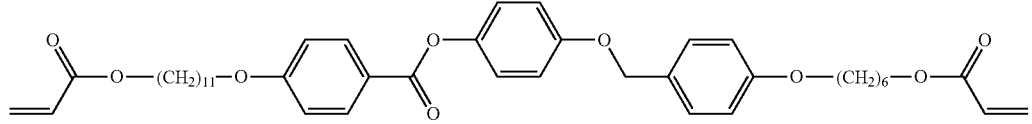
(4-31)
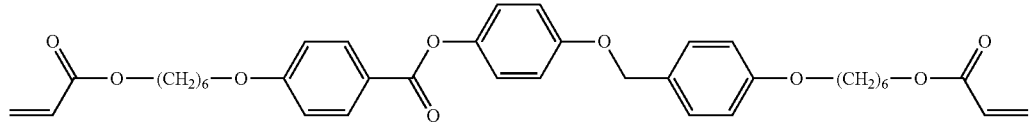
(4-32)
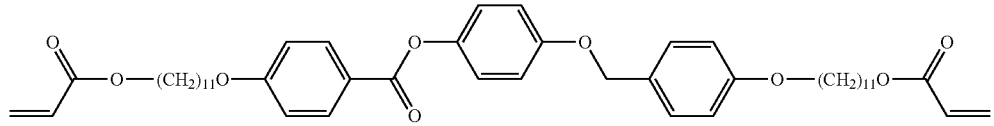
(4-33)
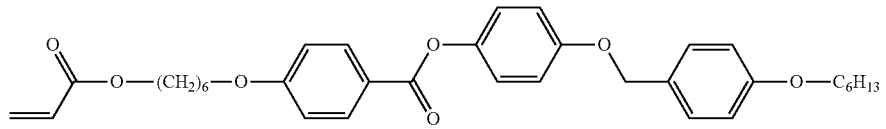

-continued

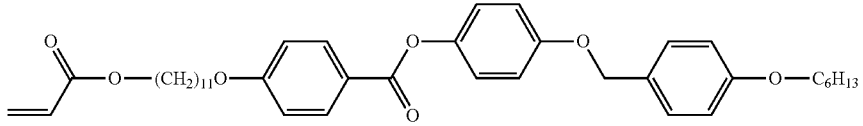
(4-34)

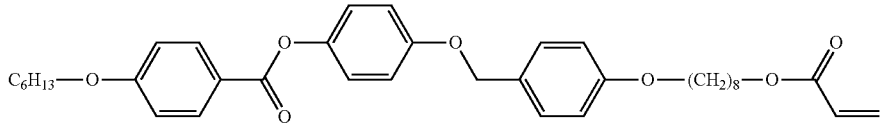
(4-35)

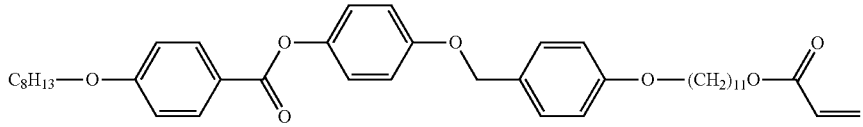
(4-36)

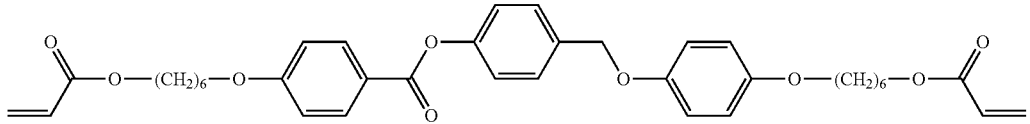
(4-37)

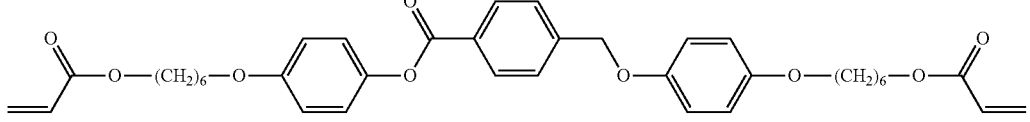
(4-38)

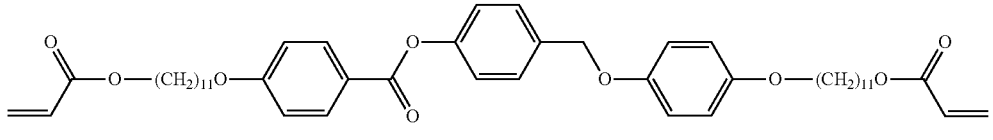
(4-39)

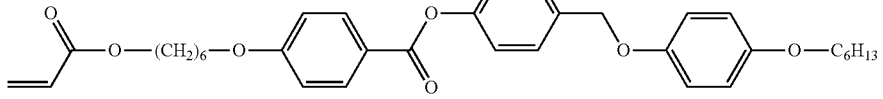
(4-40)

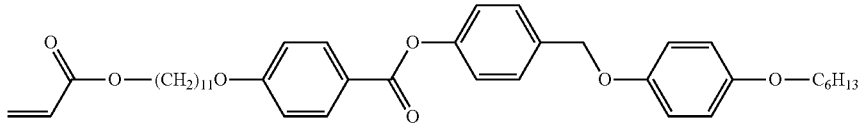
(4-41)

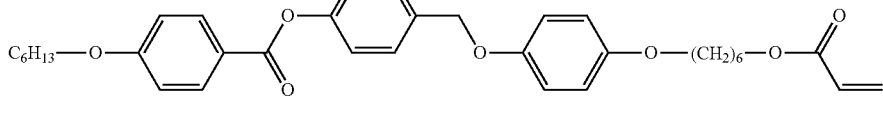
(4-42)

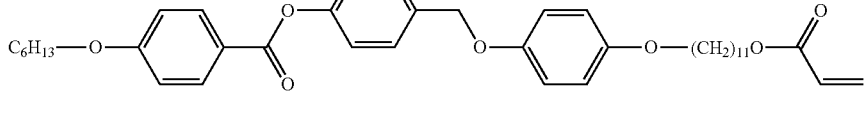
(4-43)

Among the above-mentioned specific examples of the polymerizable liquid crystal compound, at least one compound (4) selected from the group consisting of the compounds represented by the formulae (4-5), (4-6), (4-7), (4-8), (4-9), (4-10), (4-11), (4-12), (4-13), (4-14), (4-15), (4-22), (4-24), (4-25), (4-26), (4-27), (4-28) and (4-29) is preferred.

The composition of the present invention may contain two or more compounds (4). When two or more polymerizable liquid crystal compounds are combined, it is preferred that at least one of the polymerizable liquid crystal compounds is the compound (4), and it is more preferred that two or more of the polymerizable liquid crystal compounds are the compound (4). When two or more polymerizable liquid crystal compounds are combined, it may be able to temporarily retain the liquid crystal phase even at a temperature of not higher than a liquid crystal-crystal phase transition temperature. The mixing ratio in combination of two polymerizable liquid crystal compounds is usually 1:99 to 50:50, preferably 5:95 to 50:50, more preferably 10:90 to 50:50.

The compound (4) can be produced using a method as described in a known document such as, for example, Lub et al. Recl. Tray. Chim. Pays-Bas, 115, 321-328 (1996) or JP-B-4719156.

The content ratio of the polymerizable liquid crystal compound in the composition of the present invention is preferably 70 to 99.5 parts by mass, more preferably 80 to 99 parts by mass, still more preferably 80 to 94 parts by mass, especially preferably 80 to 90 parts by mass based on 100 parts by mass of a solid in the composition of the present invention for improving the orientation property of the polymerizable liquid crystal compound. Here, the solid refers to the total amount of components other than a solvent in the composition of the present invention.

The optical film of the present invention and the composition of the present invention preferably contain a polymerization initiator and a solvent, and may further contain a photosensitizer, a polymerization inhibitor and a leveling agent as necessary.

<Polymerization Initiator>

The polymerization initiator is a compound capable of initiating a polymerization reaction of the polymerizable liquid crystal compound. The polymerization initiator is preferably a photopolymerization initiator which generates active radicals under the action of light.

Examples of the polymerization initiator include benzoin compounds, benzophenone compounds, alkylphenone compounds, acylphosphine oxide compounds, triazine compounds, iodonium salts and sulfonium salts.

Examples of the benzoin compound include benzoin, benzoin methyl ether, benzoin ethyl ether, benzoin isopropyl ether and benzoin isobutyl ether.

Examples of the benzophenone compound include benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone.

Examples of the alkylphenone compound include diethoxyacetophenone, 2-methyl-2-morphorino-1-(4-methylthiophenyl)propane-1-one, 2-benzyl-2-dimethylamino-1-(4-morphorinophenyl)butane-1-one, 2-hydroxy-2-methyl-1-phenylpropane-1-one, 1,2-diphenyl-2,2-dimethoxyethane-1-one, 2-hydroxy-2-methyl-1-[4-(2-hydroxyethoxy)phenyl]propane-1-one, 1-hydroxycyclohexylphenylketone, and oligomers of 2-hydroxy-2-methyl-1-[4-(1-methylvinyl)phenyl]propane-1-one.

Examples of the acylphosphine oxide compound include 2,4,6-trimethylbenzoyldiphenylphosphine oxide and bis(2,4,6-trimethylbenzoyl)phenylphosphine oxide.

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)etheynyl]-1,3,5-triazine and 2,4-bis(trichloromethyl)-6-[2-(3,4-dimethoxyphenyl)ethenyl]-1,3,5-triazine.

Examples of the iodonium salt or the sulfonium salt include salts represented by the following formulae.

[Chemical Formula 16]

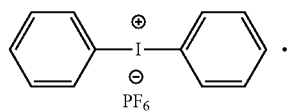

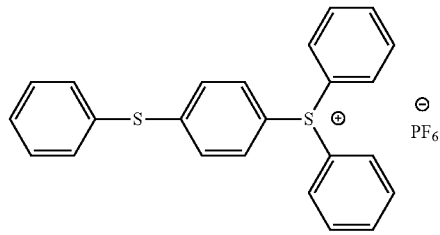

The polymerization initiators may be used alone, or combination of two or more thereof.

As the polymerization initiator, a commercial product may be used. Examples of the commercially available polymerization initiator include IRGACURE (registeredtrademark) 907, 184, 651, 819, 250 and 369 (manufactured by Ciba Specialty Chemicals Inc.); SEIKUOL (registered trademark) BZ, Z and BEE (manufactured by Seiko Chemical Co., Ltd.); KAYACURE (registered trademark) BP100 and UVI-6992 (manufactured by The Dow Chemical Company); ADEKA OPTOMER SP-152 and SP-170 (manufactured by ADEKA CORPORATION); TAZ-A and TAZ-PP (manufactured by Nihon Siberhegner K.K.); and TAZ-104 (manufactured by Sanwa Chemical Co., Ltd.).

When the composition of the present invention contains a polymerization initiator, the content of the polymerization initiator in the composition of the present invention is usually 0.1 to 30 parts by mass, preferably 0.5 to 10 parts by mass, more preferably 0.5 to 8 parts by mass based on 100 parts by mass of the polymerizable liquid crystal compound for ensuring that the orientation of the polymerizable liquid crystal compound is hardly disordered.

<Solvent>

The solvent is preferably a solvent capable of fully dissolving the compound (A) and the compound (B) as well as the polymerizable liquid crystal compound. Further, the solvent is preferably a solvent inactive to a polymerization reaction of the polymerizable liquid crystal compound.

Examples of the solvent include alcohol solvents such as methanol, ethanol, ethylene glycol, isopropyl alcohol, propylene glycol, ethylene glycol methyl ether, ethylene glycol butyl ether and propylene glycol monomethylether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorine-containing solvents such as chloroform and chlorobenzene. These solvents may be used alone, or in combination of two or more thereof.

The content of the solvent based on 100 parts by mass of the composition is preferably 50 parts by mass to 98 parts by mass. Thus, the content of the solid based on 100 parts by mass of the composition is preferably 2 parts by mass to 50 parts by mass. When the content of the solid in the composition is 50 parts by mass or less, the composition has a low viscosity, and therefore the resulting optical film has a uniform thickness, so that unevenness tends to hardly occur in the optical film. The content of the solid can be appropriately determined with consideration given to the thickness of an optical film to be produced.

<Sensitizer>

By using a sensitizer, the polymerization reaction of the polymerizable liquid crystal compound can be further accelerated.

The sensitizer is preferably a photosensitizer particularly when the composition of the present invention contains a photopolymerization initiator. Examples of the sensitizer include xanthone compounds xanthone and thioxanthone (2,4-diethylthioxanthone, 2-isopropylthioxanthone and the like); anthracene compounds such as anthracene and alkoxy group-containing anthracene (such as dibutoxyanthracene); and phenothiazine and rubrene.

The content of the sensitizer in the composition is preferably 0.1 parts by mass to 30 parts by mass, more preferably 0.5 parts by mass to 10 parts by mass, still more preferably 0.5 parts by mass to 8 parts by mass based on 100 parts by mass of the polymerizable liquid crystal compound.

<Polymerization Inhibitor>

By using a polymerization inhibitor, the degree of progression of the polymerization reaction of the polymerizable liquid crystal compound can be controlled.

Examples of the polymerization inhibitor include radical scavengers such as phenol-based compounds such as 2,6-di-tert-butyl-4-methylphenol; sulfur-based compounds such as dilauryl thiodipropionate; phosphorus-based compounds such as trioctyl phosphite; and amine-based compounds including a hindered amine structure as typified by 2,2,6,6-tetramethylpiperidine.

The polymerization inhibitor is preferably a phenol-based compound in that staining of the optical film as a liquid crystal cured film is reduced.

The content of the polymerization inhibitor in the composition is preferably 0.1 parts by mass to 30 parts by mass, more preferably 0.5 parts by mass to 10 parts by mass, still more preferably 0.5 parts by mass to 8 parts by mass based on 100 parts by mass of the polymerizable liquid crystal compound. When the content of the polymerization inhibitor is within the above-mentioned range, the polymerizable liquid crystal compound can be polymerized without disordering the orientation of the compound. The polymerization inhibitors may be used alone, or in combination of two or more thereof.

<Leveling Agent>

The leveling agent is an additive which serves to adjust the fluidity of the composition, and further flatten a film obtained by applying the composition. Examples of the leveling agent include surfactants. Examples of the preferred leveling agent include leveling agents mainly composed of a polyacrylate compound, such as "BYK-361N" (manufactured by BYK Chemie GmbH); and leveling agents mainly composed of a fluorine atom-containing compound, such as Surflon (registered trademark) "S-381" (manufactured by AGC SEIMI CHEMICAL CO., LTD.).

The content of the leveling agent in the composition is preferably 0.01 parts by mass to 5 parts by mass, more preferably 0.1 parts by mass to 3 parts by mass based on 100 parts by mass of the polymerizable liquid crystal compound. When the content of the leveling agent is within the above-mentioned range, it is easy to horizontally orient the polymerizable liquid crystal compound, and the resulting optical film tends to be more smooth. The composition may contain two or more leveling agents.

Embodiment 2: Optical Film

An optical film according to embodiment 2 of the present invention contains the composition according to embodiment 1 of the present invention.

Preferably, the optical film of the present invention is formed of the composition of the present invention which contains a polymerizable liquid crystal compound. More specifically, the optical film of the present invention can be composed of a liquid crystal cured film formed by curing the composition of the present invention by polymerizing a polymerizable liquid crystal compound (polymerizable component) in the composition containing the polymerizable liquid crystal compound. Thus, the optical film of the present invention can contain a polymer of the polymerizable liquid crystal compound.

The optical film of the present invention is usually a film with a thickness of 5 μm or less in which a polymerizable liquid crystal compound is cured in an oriented state. The optical film of the present invention is preferably a liquid crystal cured film with a polymerizable liquid crystal compound cured in a state of being oriented in a horizontal or perpendicular direction with respect to a base material surface.

The thickness of the optical film of the present invention is preferably 0.5 μm to 5 μm, more preferably 1 μm to 3 μm. The thickness of the polarizing film can be measured using an interference thickness meter, a laser microscope or a contact-type thickness meter.

The optical film of the present invention contains the compound (A) and the compound (B) each serving as a dichroic dye, and thus exhibits a high dichroic ratio.

<Member of Optical Film>

The optical film of the present invention can be obtained usually by applying the composition of the present invention, which contains a polymerizable liquid crystal compound, onto a base material or an orientation film formed on the base material, and polymerizing the polymerizable liquid crystal compound in the composition.

Members for forming the optical film of the present invention, specifically a base material and an orientation film which are used in production of the optical film of the present invention.

<Base Material>

Examples of the base material include glass base materials and plastic base materials. Plastic base materials are preferred. Examples of the plastic for forming the plastic base material include plastics such as polyolefins such as polyethylene, polypropylene and norbornene-based polymers; cyclic olefin-based resins; polyvinyl alcohol; polyethylene terephthalate; polymethacrylic acid esters; polyacrylic acid esters; cellulose esters such as triacetyl cellulose, diacetyl cellulose and cellulose acetate propionate; polyethylene naphthalate; polycarbonate; polysulfone; polyether sulfone; polyether ketone; and polyphenylene sulfide and polyphenylene oxide.

Examples of the commercial available cellulose ester base material include "FUJITAC" (manufactured by Fuji Photo Film Co., Ltd.); and "KC8UX2M", "KC8UY" and "KC4UY" (manufactured by Konica Minolta Opto Co., Ltd.).

Examples of the commercially available cyclic olefin-based resin include "Topas" (registered trademark) (manufactured by Ticona Inc.); "ARTON" (registered trademark) (manufactured by JSR Corporation); "ZEONOR" (registered trademark) and "ZEONEX" (registered trademark) (manufactured by Zeon Corporation); and "APEL" (registered trademark") (manufactured by Mitsui Chemicals, Inc.). Abase material can be obtained by forming such a cyclic olefin-based resin into a film using a known method such as a solvent cast method or a melt-extruding method. A commercial available cyclic olefin-based resin base material can also be used. Examples of the commercial available cyclic olefin-based resin base material include "ESSINA" (registered trademark) and "SCA40" (registered trademark) (manufactured by Sekisui Chemical Company, Limited); "ZEONOR FILM" (registered trademark) (manufactured by Optes Inc.); and "ARTON FILM" (registered trademark) (manufactured by JSR Corporation).

The thickness of the base material is preferably small for the base material to have a mass suitable for practical handling, but when the thickness is excessively small, the strength tends to decrease, resulting in poor processability. The thickness of the base material is usually 5 µm to 300 µm, preferably 20 µm to 200 µm.

<Orientation Film>

The orientation film is a film having a thickness of 500 nm or less, and having an orientation regulating force for liquid-crystallographically orienting the polymerizable liquid crystal compound in a desired direction. Examples of the orientation film include orientation films formed of an orientational polymer, photo-orientation films and groove orientation films.

The orientation film facilitates the liquid crystal orientation of the polymerizable liquid crystal compound. The states of liquid crystal orientation such as a horizontal orientation, a perpendicular orientation, a hybrid orientation and an inclined orientation vary depending on the natures of the orientation film and the polymerizable liquid crystal compound, and a combination of the states of liquid crystal orientation can be arbitrarily selected. When the orientation film is a material which develops a horizontal orientation by an orientation regulation force, the polymerizable liquid crystal compound can form a horizontal orientation or a hybrid orientation. When the orientation film is a material which develops a perpendicular orientation, the polymerizable liquid crystal compound can form a perpendicular orientation or an inclined orientation. The expressions of "horizontal", "perpendicular" and the like mentioned here refer to a direction of the major axis of the oriented polymerizable liquid crystal compound with the optical film (polarizing film) plane as a reference. The perpendicular orientation is an orientation including the major axis of the polymerizable liquid crystal compound oriented in a direction perpendicular to the optical film (polarizing film) plane. The term "perpendicular" mentioned here means an angle of 90°±20° with respect to the optical film (polarizing film) plane.

When the orientation film is formed of an orientational polymer, the orientation regulation force can be arbitrarily adjusted according to the surface state of the polymer and rubbing conditions. When the orientation film is formed of a photo-orientational polymer, the orientation regulation force can be arbitrarily adjusted according to conditions for irradiating the polymer with polarized light, etc. The liquid crystal orientation of the polymerizable liquid crystal compound can also be controlled by selecting physical properties such as a surface tension and liquid crystal properties of the polymerizable liquid crystal compound.

The orientation film formed between the base material and the optical film (polarizing film) is preferably a film which is insoluble in a solvent to be used in formation of the optical film (polarizing film) on the orientation film, and has heat resistance in heating treatment for removal of the solvent and orientation of a liquid crystal. Examples of the orientation film include orientation films formed of an orientational polymer, photo-orientation films and groove orientation films.

The thickness of the orientation film is usually 10 nm to 500 nm, preferably 10 nm to 200 nm.

<Orientation Film Formed of Orientational Polymer>

The orientation film formed of an orientational polymer is usually prepared in the following manner: a composition with an orientational polymer dissolved in a solvent (hereinafter, sometimes referred to as an orientational polymer composition) is applied to a base material, and the solvent is removed; or an orientational polymer composition is applied to a base material, the solvent is removed, and the applied orientational polymer composition is rubbed (rubbing method).

The concentration of the orientational polymer in the orientational polymer composition may be within a range which ensures that the orientational polymer material can be fully dissolved in the solvent, and the concentration of the orientational polymer is preferably 0.1% by mass to 20% by mass, more preferably 0.1% by mass to 10% by mass in terms of a solid content based on the amount of the solution.

Examples of the commercial available orientational polymer composition include SUNEVER (registered trademark) (manufactured by Nissan Chemical Industries, Limited) and OPTOMER (registered trademark) (manufactured by JSR Corporation).

<Photo-Orientation Film>

The photo-polymerization is usually prepared in the following manner: a composition containing a polymer or monomer (photo-orientational material) having a photoreactive group, and a solvent (hereinafter, the composition is sometimes referred to as a photo-orientation film forming composition) is applied to a base material, and irradiated with polarized light (preferably polarized UV light). The photo-orientation film is more preferred in the orientation regulation force can be arbitrarily controlled by selecting a polarization direction of polarized light to be applied.

The photoreactive group refers to a group which develops a liquid crystal orientation ability upon application of light. Specifically, the photoreactive group is a group which causes a photoreaction as an origin of the liquid crystal orientation ability, such as induction of orientation, or an isomerization reaction, a dimerization reaction, a photo-crosslinking or a photodegradation reaction of molecules generated upon application of light. Among such photoreactive groups, a group which causes a dimerization reaction or a photo-crosslinking reaction is preferred because it has an excellent orientation property. The photoreactive group which can cause the above-mentioned reaction is preferably a group having an unsaturated bond, particularly a double bond, especially preferably a group having at least unsaturated bond selected from the group consisting of a carbon-carbon double bond (C=C bond), a carbon-nitrogen double bond (C=N bond), a nitrogen-nitrogen double bond (N=N bond), and a carbon-oxygen double bond (C=O bond).

The content of the polymer or monomer having a photoreactive group, based on the amount of the photo-orientation film forming composition, is preferably 0.2% by mass or more, especially preferably 0.3% by mass to 10% by mass. The photo-orientation film forming composition may contain a high-molecular material such as polyvinyl alcohol or polyimide and a photosensitizer within the bounds of not significantly impairing the properties of the photo-orientation film.

For application of polarized light, the photo-orientation film forming composition applied on a substrate may be freed of a solvent, and directly irradiated with polarized light, or polarized light may be applied to the base material, and transmitted to irradiate the composition with polarized light. The polarized light is especially preferably substantially parallel light. The wavelength of the polarized light to be applied is preferably a wavelength in a wavelength range which ensures that the photoreactive group in the polymer or monomer having the photoreactive group can absorb light energy. Specifically, UV light (ultraviolet ray) having a wavelength of 250 nm to 400 nm is especially preferred.

When the composition is masked in rubbing or application of polarized light, a plurality of regions (patterns) different in direction of liquid crystal orientation.

<Groove Orientation Film>

The groove orientation film is a film having an irregularity pattern or a plurality of grooves on a film surface. When the polymerizable liquid crystal compound is applied to a film having a plurality of linear grooves arranged at equal intervals, liquid crystal molecules are oriented in a direction along the grooves.

Examples of the method for obtaining a groove orientation film include a method in which a photosensitive polyimide film surface is exposed through an exposure mask having a pattern-shaped slit, and the film is then developed and rinsed to form an irregularity pattern; a method in which a layer of UV-curable resin before curing is formed on an original board having a groove on a surface thereof, and the resin layer is transferred to a base material, and then cured; and a method in which a film of UV-curable resin before curing is formed on a base material, and a roll-shaped original board having a plurality of grooves is abut against the film to form irregularities, followed by curing the film. Specific examples of the method for obtaining a groove orientation film include methods described in JP-A-6-34976 and JP-A-2011-242743.

Examples of the method for applying the composition of the present invention include the same methods as those described above as examples of the method for applying the orientational polymer composition to the base material.

When the composition of the present invention contains a solvent, the solvent is usually removed from the formed coating film. Examples of method for removing the solvent include natural drying, forced-air drying, drying by heating and drying under reduced pressure.

The polymerizable liquid crystal compound contained in the formed coating film is usually oriented to form a liquid crystal phase when the film is heated to a temperature of not lower than a temperature at which the compound turns into a solution state, and the film is then cooled to a temperature at which the compound is liquid-crystallographically oriented.

The temperature at which the polymerizable liquid crystal compound contained in the formed coating film is oriented may be determined beforehand by, for example, observation of textures using a composition containing the polymerizable liquid crystal compound. The solvent may be removed concurrently with liquid crystal orientation. The temperature here depends on the kinds of a solvent to be removed, and a polymerizable liquid crystal compound, but is preferably in the range of 50 to 200° C., and more preferably in the range of 80 to 130° C. when the base material is a resin base material.

When a base material being a quarter-wave plate is used to obtain a circular polarizing plate including the optical film of the present invention and the quarter-wave plate, the orientation direction of the polymerizable liquid crystal compound may be set in such a manner that the transmission axis of the resulting optical film and the slow axis (optical axis) of the base material form an angle of substantially 45°.

The polymerizable liquid crystal compound is polymerized by irradiating the oriented polymerizable liquid crystal compound with an active energy ray.

The oriented polymerizable liquid crystal compound is polymerized to obtain an optical film containing the polymerizable liquid crystal compound polymerized in an oriented state, and the compound (A) and the compound (B) that are oriented along with the polymerizable liquid crystal compound.

A polarizing film (optical film) containing a polymerizable liquid crystal compound polymerized while retaining a smectic liquid crystal phase has higher polarizing performance as compared to a conventional host-guest-type polarizing film, i.e. a polarizing film obtained by polymerizing a polymerizable liquid crystal compound etc. while retaining a nematic liquid crystal phase, and is superior in polarizing performance and strength to a polarizing film obtained by applying only a dichroic dye or a liquid crystal compound of lyotropic liquid crystal type.

The light source of an active energy ray may be a light source which generates an ultraviolet ray, an electron beam, an X-ray or the like. The light source is preferably a light source having a light emission distribution at a wavelength of 400 nm or less, such as a low-pressure mercury lamp, a middle-pressure mercury lamp, a high-pressure mercury lamp, an ultra-high-pressure mercury lamp, a chemical lamp, a black light lamp, a microwave-excited mercury lamp or a metal halide lamp.

The irradiation energy of the active energy ray is set to preferably 10 to 5000 mJ/cm$^2$, more preferably 100 to 2000 mJ/cm$^2$ in terms of an irradiation intensity in a wavelength range effective for activation of a polymerization initiator. When the irradiation energy is lower than 10 mJ/cm$^2$, curing of the polymerizable liquid crystal compound tends to be insufficient.

The thickness of the thus-formed optical film of the present invention is preferably not less than 0.5 μm and not more than 10 μm, more preferably not less than 1 μm and not more than 5 μm. The thickness of the optical film of the present invention can be determined by measurement using an interference thickness meter, a laser microscope or a contact-type thickness meter.

The optical film of the present invention is especially preferably an optical film in which a Bragg peak is obtained in X-ray diffraction measurement. The optical film of the present invention in which such a Bragg peak is obtained is, for example, a polarizing film which shows a diffraction peak derived from a hexatic phase or a crystal phase.

The maximum absorption ($\lambda_{max1}$) in the optical film of the present invention exists preferably in the range of 400 cm to 800 nm, more preferably in the range of 500 nm to 680 nm.

The dichroic ratio shown by the optical film of the present invention is 65 or more, preferably 70 or more, more preferably 75 or more.

When the base material used is not a quarter-wave plate, a circular polarizing plate can be obtained by laminating the resulting optical film (polarizing film) of the present invention and the quarter-wave plate. Here, it is preferred to perform the lamination in such a manner that the transmission axis of the optical film of the present invention and the slow axis (optical axis) of the quarter-wave plate form an angle of substantially 45°. A circular polarizing plate serving as an optical compensation film can also be obtained by making the transmission axis of the optical film (polarizing film) of the present invention coincident with or orthogonal to the optical axis of a phase difference film such as a quarter-wave plate.

The lamination of the optical film of the present invention and the quarter-wave plate may be performed together with a base material provided with the optical film of the present invention, or a base material provided with an orientation film, or may be performed after removal of the base material, or the base material and the orientation film. The base material, or the optical film of the present invention which is formed on a surface of the base material which is provided with the orientation film can be laminated with the quarter-wave plate by, for example, bonding the surface provided with the polarizing film of the present invention and the quarter-wave plate to each other by use of an adhesive, followed by removing the base material, or the base material provided with the optical film. Here, the adhesive may be applied to the optical film of the present invention, or applied to the quarter-wave plate.

<Uses of Optical Film>

The optical film (polarizing film) and the circular polarizing plate can be used in various display devices.

The display device is a device including a display element. The display device includes a light emitting element or a light emitting device as a light emitting source. Examples of the display device include liquid crystal display devices, organic electroluminescence (EL) display devices, inorganic electroluminescence (EL) display devices, touch panel display devices, electron emission display devices (field emission display devices (FED etc.) and surface field emission devices (SED)), electronic papers (display devices using electronic inks and electrophoretic elements), plasma display devices, projection-type display devices (grating light valve (GLV) display devices, display devices including digital micromirror devices (DMD) and so on) and piezoelectric ceramic displays. The liquid crystal display devices include all of transmission-type liquid crystal display devices, semi-transmission-type liquid crystal display devices, reflection-type liquid crystal display devices, direct view-type liquid crystal display devices, projection-type liquid crystal display devices and so on. These display devices may be display devices which display two-dimensional images, or stereoscopic display devices which display three-dimensional images. Particularly, the circular polarizing plate can be effectively used in organic EL display devices and inorganic EL display devices, and the optical compensation polarizing plate can be effectively used in liquid crystal display devices and touch panel display devices.

EXAMPLES

<Chemicals Used>

[Dichroic Dye]

Dichroic dyes to be used in examples and comparative examples are shown below.

[Chemical Formula 17]

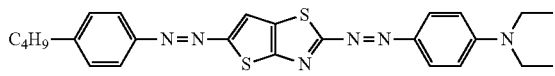
(A-1)

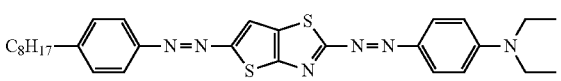
(B-1)

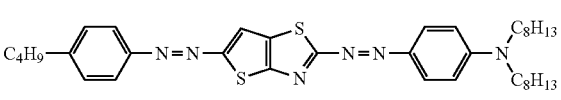
(B-20)

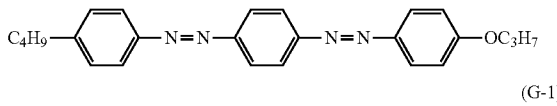
(F-1)

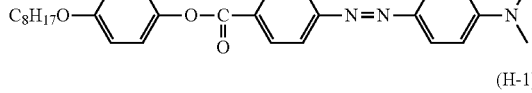
(G-1)

(H-1)

[Polymerizable Liquid Crystal Compound]

Polymerizable liquid crystal compounds to be used in examples and comparative examples are shown below.

[Chemical Formula 18]

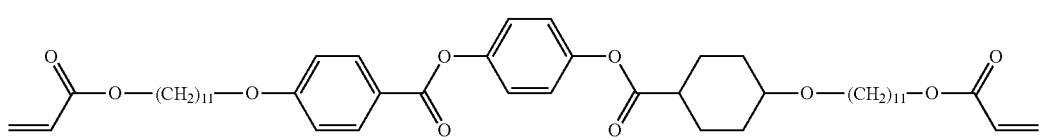
(4-6)

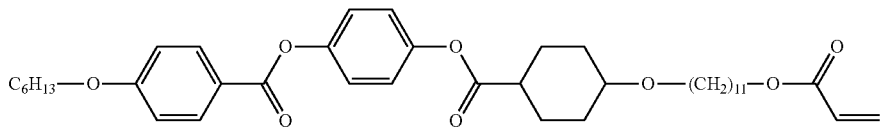
(4-8)

[Others]

Other chemicals to be used in examples and comparative examples are shown below.

Polymerizable liquid crystal compound A:

dipentaerythritol hexaacrylate (manufactured by Daicel-Cytec Co., Ltd.)

Polymerization initiator A:
2-dimethylamino-2-benzyl-1-(4-morphorinophenyl)butane-1-one (IRGACURE 369; manufactured by Ciba Specialty Chemicals Inc.)

Polymerization initiator B: 1-hydroxycyclohexyl phenyl ketone (IRGACURE 184; manufactured by Ciba Specialty Chemicals Inc.)

Leveling agent A: polyacrylate compound (BYK-361N; manufactured by BYK-Chemie GmbH)

Solvent A: xylene-isophorone (mass ratio: 95:5)

Example 1

[Preparation of Optical Film Forming Composition]

A mixture obtained by mixing 2.5 parts by mass of a compound (F-1); 3.0 parts by mass of a compound (G-1); 2.2 parts by mass of a compound (H-1); 1.9 parts by mass of a compound (A-1); 1.1 parts by mass of a compound (B-1); 90 parts by mass of a compound (4-6) and 10 parts by mass of a compound (4-8) as polymerizable liquid crystal compounds; 5 parts by mass of a non-liquid-crystal compound A; 1 part by mass of a polymerization initiator A; 6 parts by mass of a polymerization initiator B; 0.5 parts by mass of a leveling agent A; and 400 parts by mass of a solvent A was stirred at 80° C. for 1 hour. After it was confirmed by visual observation that soluble components in the mixture were fully dissolved, the mixture including the fully dissolved components was filtered using a filter with a pore size of 0.2 micrometers, thereby obtaining an optical film forming composition (1). The contents of the dichroic dyes in the composition are shown in Table 1.

[Production of Optical Film, and Evaluation of Composition and Optical Film]

1. Formation of Orientation Film

A glass base material used as a base material.

A 2 mass % aqueous solution of polyvinyl alcohol (Polyvinyl Alcohol 1000 (fully saponified) manufactured by Wako Pure Chemical Industries, Ltd.) (orientation film polymer composition) was applied onto the glass base material by a spin coating method, and dried to form a 100 nm-thick film. Subsequently, a surface of the resulting film was subjected to a rubbing treatment to form an orientation layer. The rubbing treatment was performed with a cloth (trade name: YA-20-RW, manufactured by YOSHIKAWA CHEMICAL CO., LTD.) under the conditions of a pushing depth of 0.15 mm, a rotation number of 500 rpm and a rate of 16.7 mm/s using a semiautomatic rubbing apparatus (trade name: Model LQ-008, manufactured by JOYO ENGINEERING CO., LTD.). A laminate (1) with an orientation film formed on a glass base material was obtained through the rubbing treatment.

2. Formation of Optical Film

The optical film forming composition (1) was applied onto the orientation film of the laminate (1) by a spin coating method, heated and dried on a hot plate at 120° C. for 1 minute, and then quickly cooled to room temperature to form a dry film on the orientation layer. The dry film was then irradiated with an ultraviolet ray in an exposure amount of 1500 mJ/cm$^2$ (313 nm basis) using an UV irradiation apparatus (SPOT CURE SP-7 manufactured by USHIO INC.), whereby the polymerizable liquid crystal compound contained in the dry film was polymerized, so that an optical film (polarizing film) was formed from the dry film to obtain a laminate (2). The thickness of the optical film (polarizing film) here was measured with a laser microscope (OLS 3000 manufactured by Olympus Corporation), and the result showed that the thickness of the polarizing film was 1.8 μm.

3 Measurement of Dichroic Ratio

For checking the usefulness of the resulting optical film (polarizing film), the dichroic ratio of the laminate (2) was measured in the following manner.

An absorbance (A1) in a transmission axis direction and an absorbance (A2) in an absorption axis direction at a maximum absorption wavelength were measured by a double beam method using an apparatus in which a folder with a polarizer was set in a spectrophotometer (UV-3150 manufactured by Shimadzu Corporation). A mesh for cutting a light amount by 50% was installed on the reference side of the folder. From the measured values of the absorbance (A1) in the transmission axis direction and the absorbance (A2) in the absorption axis direction, the ratio (A2/A1) was calculated, and defined as a dichroic ratio. The results are shown in the table. The usefulness of the polarizing film (optical film) may be improved as the dichroic ratio increases. The results of measuring the absorbance (A2) and the maximum absorption wavelength in the absorption axis direction, and the dichroic ratio at the wavelength are shown in Table 2.

4. Evaluation of External Appearance of Polarizing Film

The optical film forming composition (1) was left standing at 20° C. for 90 hours, a polarizing film was then prepared by a similar method, and whether or not orientation defects occurred due to crystal precipitation was evaluated by visual observation and microscope observation. The evaluation results are shown in Table 1. The evaluation was performed in two grades in the following manner: a sample having orientation defects was rated "x", and a sample having no orientation defects and retaining orientation property was rated "○". The evaluation results are shown in Table 2.

5. Evaluation of Composition for Dye Precipitation

The optical film forming composition (1) just after preparation and the optical film forming composition (1) left standing and stored at 20° C. for 90 hours were filtered using a filter with a pore size of 0.2 micrometers, and the resulting solution was analyzed by liquid chromatography to calculate the retention ratios of the compound (A) and the compound (B). The retention ratio was determined from the value of [(peak area of dye (580 nm))/(peak area of isophorone (254 nm))]×100 before and after storage. The evaluation results are shown in Table 2.

The liquid chromatography (LC) was performed under the following measurement conditions.

Column: Kinetex 2.6u C18 100 A (4.6 mm×100 mm)
Mobile phase: liquid A: 0.1% TFA/water
liquid B: 0.1% TFA/acetonitrile
Oven temperature: 40° C.
Initial concentration of liquid B:
LC program: time/unit/processing instruction/value
  0.01/pump/B. Conc/2
  30.00/pump/B. Conc/100
  40.00/pump/B. Conc/100
  40.01/pump/B. Conc/2
  50.00/pump/B. Conc/2
  50.00/controller/stop Example 2

Except that the amount of the compound (A-1) used was changed to 1.5 parts by mass, and the amount of the compound (B-1) used was changed to 1.6 parts by mass, the same procedure as in Example 1 was carried out to obtain an optical film forming composition (2). Using the optical film forming composition (2), an optical film was prepared in the same manner as in Example 1. The resulting optical film forming composition (2) and an optical film formed from the optical film forming composition (2) were evaluated in the same manner as in Example 1. The contents of the dichroic dyes in the composition are shown in Table 1, and the results of the evaluation are shown in Table 2.

Example 3

Except that the amount of the compound (A-1) used was changed to 1.0 parts by mass, and the amount of the compound (B-1) used was changed to 2.2 parts by mass, the same procedure as in Example 1 was carried out to obtain an optical film forming composition (3). Using the optical film forming composition (3), an optical film was prepared in the same manner as in Example 1. The resulting optical film forming composition (3) and an optical film formed from the optical film forming composition (3) were evaluated in the same manner as in Example 1. The contents of the dichroic dyes in the composition are shown in Table 1, and the results of the evaluation are shown in Table 2.

Example 4

Except that the amount of the compound (A-1) used was changed to 0.7 parts by mass, and the amount of the compound (B-1) used was changed to 2.4 parts by mass, the same procedure as in Example 1 was carried out to obtain an optical film forming composition (4). Using the optical film forming composition (4), an optical film was prepared in the same manner as in Example 1. The resulting optical film forming composition (4) and an optical film formed from the optical film forming composition (4) were evaluated in the same manner as in Example 1. The contents of the dichroic dyes in the composition are shown in Table 1, and the results of the evaluation are shown in Table 2.

Comparative Example 1

Except that the amount of the compound (A-1) used was changed to 2.9 parts by mass, and the compound (B-1) was not used, the same procedure as in Example 1 was carried out to obtain a comparative optical film forming composition (1). Using the comparative optical film forming composition (1), an optical film was prepared in the same manner as in Example 1. The resulting comparative optical film forming composition (1) and an optical film formed from the comparative optical film forming composition (1) were evaluated in the same manner as in Example 1. The contents of the dichroic dyes in the composition are shown in Table 1, and the results of the evaluation are shown in Table 2.

Comparative Example 2

Except that the compound (A-1) was not used, and the amount of the compound (B-1) used was changed to 3.2 parts by mass, the same procedure as in Example 1 was carried out to obtain a comparative optical film forming composition (2). Using the comparative optical film forming composition (2), an optical film was prepared in the same manner as in Example 1. The resulting comparative optical film forming composition (2) and an optical film formed from the comparative optical film forming composition (2) were evaluated in the same manner as in Example 1. The contents of the dichroic dyes in the composition are shown in Table 1, and the results of the evaluation are shown in Table 2.

Comparative Example 3

Except that 1.0 part by mass of the compound (B-20) was used in place of the compound (B-1), the same procedure as in Example 1 was carried out to obtain a comparative optical film forming composition (3). Using the comparative optical film forming composition (3), an optical film was prepared in the same manner as in Example 1. The resulting comparative optical film forming composition (3) and an optical film formed from the comparative optical film forming composition (3) were evaluated in the same manner as in Example 1. The contents of the dichroic dyes in the composition are shown in Table 1, and the results of the evaluation are shown in Table 2.

TABLE 1

| | Content of dichroic dye (parts by mass) | | | | | |
|---|---|---|---|---|---|---|
| | Compound (F-1) | Compound (G-1) | Compound (H-1) | Compound (A-1) | Compound (B-1) | Compound (B-20) |
| Example 1 | 2.5 | 3.0 | 2.2 | 1.9 * (67%) | 1.1 * (33%) | — |
| Example 2 | 2.5 | 3.0 | 2.2 | 1.5 * (50%) | 1.6 * (50%) | — |
| Example 3 | 2.5 | 3.0 | 2.2 | 1.0 * (33%) | 2.2 * (67%) | — |
| Example 4 | 2.5 | 3.0 | 2.2 | 0.7 * (25%) | 2.4 * (75%) | — |
| Comparative Example 1 | 2.5 | 3.0 | 2.2 | 2.9 * (100%) | — | — |
| Comparative Example 2 | 2.5 | 3.0 | 2.2 | — | 3.2 * (100%) | — |
| Comparative Example 3 | 2.5 | 3.0 | 2.2 | 1.9 * (70%) | — | 1.0 * (30%) |

* The columns for the compound (A-1), (B-1) and (B-20) show not only the content (parts by mass) of the dichroic dye, but also the content (molar ratio) of each compound provided that the total content of the compound (A) and the compound (B) is 100 mol %.

TABLE 2

| | Just before preparation | After storage at 20° C. for 90 hr after preparation | | | |
|---|---|---|---|---|---|
| | Dichroic ratio | External appearance of | External appearance of | Retention ratio of composition | |
| | (650 nm) | optical film | optical film | Compound (A) | Compound (B) |
| Example 1 | 76 | ○ | ○ | 100% | 100% |
| Example 2 | 76 | ○ | ○ | 100% | 100% |
| Example 3 | 78 | ○ | ○ | 100% | 100% |
| Example 4 | 78 | ○ | ○ | 100% | 100% |
| Comparative Example 1 | 72 | ○ | x | 21% | — |
| Comparative Example 2 | 76 | ○ | x | — | 17% |
| Comparative Example 3 | 63 | ○ | ○ | 100% | *100% |

*The retention ratio of the compound (B) in Comparative Example 3 represents the retention ratio of the compound (B-20).

CONCLUSIONS

The result of comparison between Examples 1 to 4 and Comparative Examples 1 and 2 based on the descriptions in Tables 1 and 2 has shown that by using a composition containing both the compound (A) and the compound (B), an optical film having no orientation defects and having excellent external appearance quality can be formed even after the composition is stored for a predetermined period of time.

The result of comparison between Examples 1 to 4 and Comparative Example 3 has shown that by using a composition containing both the compound (A) and the compound (B) in which $R^{1a}$ in the general formula (A) and $R^{1b}$ in the general formula (B) are mutually different groups, an optical film having a sufficiently high dichroic ratio can be formed.

An optical film formed from the composition of the present invention can be widely used in the field of production of liquid crystal display devices, liquid crystal cells, circular polarizing plates and organic EL display devices, each of which includes such an optical film (polarizing film).

What is claimed is:

1. A composition comprising a compound represented by the general formula (A) and a compound represented by the general formula (B):

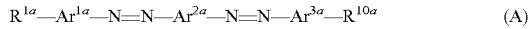

$$R^{1a}-Ar^{1a}-N=N-Ar^{2a}-N=N-Ar^{3a}-R^{10a} \quad (A)$$

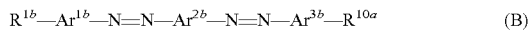

$$R^{1b}-Ar^{1b}-N=N-Ar^{2b}-N=N-Ar^{3b}-R^{10a} \quad (B)$$

wherein:
$R^{10a}$ represents a group represented by any one of the general formulae (S-1) to (S-7):

—H  (S-1)

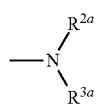
  (S-2)

—CN  (S-3)

—CF$_3$  (S-4)

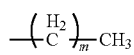
  (S-5)

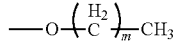
  (S-6)

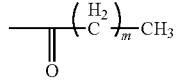
  (S-7)

wherein $R^{2a}$ and $R^{3a}$ each independently represent a hydrogen atom or an alkyl group, where the alkyl groups represented by $R^{2a}$ and $R^{3a}$ may be bound to each other to form a ring; and m represents an integer of 0 to 10; and $R^{10a}$ in the compound (A) and $R^{10a}$ in the compound (B) are identical;

$Ar^{1a}$, $Ar^{1b}$, $Ar^{2a}$, $Ar^{2b}$, $Ar^{3a}$ and $Ar^{3b}$ each independently represent a group represented by any one of the general formulae (Ar-1) to (Ar-3), and $Ar^{1a}$ and $Ar^{1b}$ are the same group represented by any one of the general formula (Ar-1) to (Ar-3), $Ar^{2a}$ and $Ar^{2b}$ are the same group represented by any one of the general formula (Ar-1) to (Ar-3), $Ar^{3a}$ and $Ar^{3b}$ are the same group represented by any one of the general formula (Ar-1) to (Ar-3):

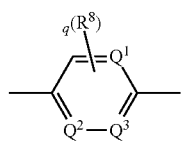
  (Ar-1)

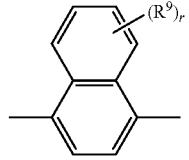
  (Ar-2)

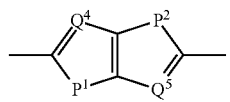
  (Ar-3)

wherein $P^1$ and $P^2$ each independently represent —S—, —O— or —N($R^{12}$)—, $R^{12}$ represents a hydrogen atom or an alkyl group having 1 to 4 carbon atoms, and $Q^1$, $Q^2$, $Q^3$, $Q^4$ and $Q^5$ each independently represent =N— or =CH—;

$R^8$ and $R^9$ are substituents other than a hydrogen atom, and each independently represent an alkyl group having 1 to 4 carbon atoms, an alkoxy group having 1 to 4 carbon atoms, a halogen atom or a cyano group, and one or more of hydrogen atoms in the alkyl group or the alkoxy group may be substituted with a halogen atom or a hydroxy group; and q and r each represent an integer of 0 to 2;

$R^{1a}$ represents an alkyl group having 2 to 5 carbon atoms, an alkoxy group having 2 to 5 carbon atoms, an acyl group having 2 to 5 carbon atoms, an oxycarbonyl group having 2 to 5 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group; and $R^{1b}$ represents an alkyl group having 3 to 20 carbon atoms, an alkoxy group having 3 to 20 carbon atoms, an acyl group having 3 to 20 carbon atoms, an oxycarbonyl group having 3 to 20 carbon atoms, a halogen atom or a cyano group, and one or more of hydrogen atoms in the alkyl group, alkoxy group, acyl group, alkoxycarbonyl group or oxycarbonyl group may be substituted by a halogen atom or a hydroxy group, with the proviso that $R^{1a}$ and $R^{1b}$ are groups having different structures from each other.

2. The composition according to claim 1, wherein in the general formula (A) and the general formula (B), $R^{10a}$ is a group represented by the general formula (S-2).

3. The composition according to claim 1, wherein $Ar^{1a}$ and $Ar^{1b}$ are the same group, $Ar^{2a}$ and $Ar^{2b}$ are the same group, and $Ar^{3a}$ and $Ar^{3b}$ are the same group.

4. The composition according to claim 1, further comprising a polymerizable liquid crystal compound.

5. The optical film according to claim 4, wherein the polymerizable liquid crystal compound is a compound which shows a smectic liquid crystal phase.

6. An optical film comprising the composition according to claim 1.

7. An optical film which is formed by polymerizing a polymerizable component contained in the composition according to claim 4.

8. A circular polarizing plate comprising the optical film according to claim 6.

9. A circular polarizing plate comprising the optical film according to claim 7.

10. A liquid crystal display device comprising the optical film according to claim 6.

11. A liquid crystal display device comprising the optical film according to claim 7.

12. A display device comprising the circular polarizing plate according to claim 8.

13. A display device comprising the circular polarizing plate according to claim 9.

* * * * *